(12) United States Patent
Shah et al.

(10) Patent No.: US 8,737,501 B2
(45) Date of Patent: May 27, 2014

(54) INTERFERENCE MITIGATION FOR DEVICES WITH MULTIPLE RECEIVERS

(75) Inventors: Anish Narendra Shah, Los Angeles, CA (US); Weijun Zhu, Los Angeles, CA (US); Babak Daneshrad, Encino, CA (US)

(73) Assignee: Silvus Technologies, Inc., Los Angeles, CA (US)

( * ) Notice: Subject to any disclaimer, the term of this patent is extended or adjusted under 35 U.S.C. 154(b) by 1392 days.

(21) Appl. No.: 12/333,234

(22) Filed: Dec. 11, 2008

(65) Prior Publication Data

US 2009/0310724 A1 Dec. 17, 2009

Related U.S. Application Data

(60) Provisional application No. 61/061,575, filed on Jun. 13, 2008.

(51) Int. Cl.
*H04B 7/02* (2006.01)

(52) U.S. Cl.
USPC ........... 375/267; 375/299; 375/347; 375/349; 455/101

(58) Field of Classification Search
None
See application file for complete search history.

(56) References Cited

U.S. PATENT DOCUMENTS

| | | | |
|---|---|---|---|
| 5,585,850 A | 12/1996 | Schwaller | |
| 7,209,515 B2 | 4/2007 | Kilfoyle et al. | |
| 7,602,745 B2 | 10/2009 | Lin et al. | |
| 7,668,268 B2 | 2/2010 | Heiskala | |
| 7,693,231 B2 | 4/2010 | Ling et al. | |
| 8,358,588 B2 | 1/2013 | Goldsmith et al. | |
| 2004/0081074 A1* | 4/2004 | Piechocki | 370/206 |
| 2005/0041746 A1 | 2/2005 | Rosen et al. | |
| 2006/0274691 A1 | 12/2006 | Naguib et al. | |
| 2007/0009059 A1 | 1/2007 | Wallace et al. | |
| 2007/0072551 A1* | 3/2007 | Pajukoski et al. | 455/63.1 |
| 2007/0164902 A1 | 7/2007 | Bang et al. | |
| 2007/0280371 A1 | 12/2007 | Bouvet et al. | |
| 2008/0292032 A1 | 11/2008 | Belogolovy et al. | |
| 2009/0312043 A1 | 12/2009 | Shah et al. | |
| 2010/0197262 A1* | 8/2010 | Hosokawa et al. | 455/234.1 |
| 2010/0208712 A1 | 8/2010 | Wax et al. | |
| 2010/0255790 A1 | 10/2010 | Farajidana et al. | |
| 2010/0303182 A1 | 12/2010 | Daneshrad et al. | |
| 2011/0060956 A1 | 3/2011 | Goldsmith et al. | |
| 2011/0128917 A1 | 6/2011 | Ko et al. | |

OTHER PUBLICATIONS

Seki et al., "A Cordic-Based Reconfigurable Systolic Array Processor for MIMO-OFDM Wireless Communications,"Signal Processing Systems, 2007 IEEE Workshop, Oct. 17-19, 2007, pp. 639-644.

(Continued)

*Primary Examiner* — Adolf Dsouza
(74) *Attorney, Agent, or Firm* — Knobbe Martens Olson & Bear, LLP

(57) ABSTRACT

Methods and systems for mitigating interference or estimating a covariance matrix in a communication system are disclosed. In some embodiments, a method of demodulating a received signal in a communication system includes receiving a first plurality of waveforms, estimating a covariance matrix based on the first plurality of waveforms, determining a spatial filter based on the estimated covariance matrix, receiving a second plurality of waveforms, generating at least one filtered waveform by applying the spatial filter to the second plurality of waveforms, and demodulating the at least one filtered waveform.

17 Claims, 34 Drawing Sheets

(56) References Cited

OTHER PUBLICATIONS

J. M. Peha, "Wireless communications and coexistence for smart environments," IEEE Pers. Commun., vol. 7, pp. 66-68, Oct. 2000.

C. Chiasserini and R. Rao. Co-existence mechanisms for interference mitigation between ieee 802.11 wlans and bluetooth. New York, Jun. 2002.

Zhiqiang Wu; Nassar, C.R., "Narrowband interference rejection in OFDM via carrier interferometry spreading codes," Wireless Communications, IEEE Transactions on , vol. 4, No. 4, pp. 1491-1505, Jul. 2005.

B. Le Flock, M. Alard, and C. Berrou, "Coded orthogonal frequency division multiplex," Proc. IEEE, vol. 83, No. 6, pp. 982-996, Jun. 1995.

D.Wiegandt, C. R. Nassar, and Z. Wu, "High-Throughput, High-Performance OFDM via Pseudo-Orthogonal Carrier Interferometry Spreading codes ," IEEE Transactions on Commun., vol. 51, No. 7, pp. 1123-1134, Jul. 2003.

D. Wiegandt and C. R. Nassar, "High-throughput, high performance OFDM via pseudo-orthogonal carrier interferometry coding," in IEEE Personal Indoor and Mobile Radio Communications (PIMRC), San Diego, CA, 2001, vol. 2, pp. G-98-G-102.

Coulson, A.J., "Narrowband interference in pilot symbol assisted OFDM systems," Wireless Communications, IEEE Transactions on , vol. 3, No. 6, pp. 2277-2287, Nov. 2004.

Carlson, B.D., "Covariance matrix estimation errors and diagonal loading in adaptive arrays," Aerospace and Electronic Systems, IEEE Transactions on , vol. 24, No. 4, pp. 397-401, Jul. 1988.

Gabriel, W., "Using spectral estimation techniques in adaptive processing antenna systems," Antennas and Propagation, IEEE Transactions on (legacy, pre-1988), vol. 34, No. 3, pp. 291-300, Mar. 1986.

Bliss, D.W., "Robust MIMO wireless communication in the presence of interference using ad hoc antenna arrays," Military Communications Conference, 2003. MILCOM 2003. IEEE , vol. 2, No., pp. 1382-1385 vol. 2, Oct. 13-16, 2003.

IEEE TGn Working Group, "Joint Proposal: High throughput extension to the 802.11 Standard," http://www.ieee802.org/11/.

Vinko Erceg, et al., "TGn Channel Models," IEEE 802.11 document 11-03/0940r4.

Zhu, W., Daneshrad, B., Bhatia, J., Chen, J., Kim, H., Mohammed, K., Nasr, O., Sasi, S., Shah, A., and Tsai, M. 2006. A real time MIMO OFDM testbed for cognitive radio & networking research. Proceedings of the 1st international Workshop on Wireless Network Testbeds, Experimental Evaluation& Characterization. WiNTECH '06. ACM, New York, NY, 115-116.

IEEE Computer Society LAN MAN Standards Committee, ed., IEEE standard for wireless LAN medium access control (MAC) and physical layer (PHY) specifications. IEEE Std 802.11-1997, The Institute of Electrical and Electronics Engineers, New York, 1997.

U.S. Appl. No. 12/333,225, filed Dec. 11, 2008.

Allen, J., "Short Term Spectral Analysis, Synthesis, and Modification by Discrete Fourier Transform," IEEE Transactions on Acoustics, Speech and Signal Processing, Jun. 1977, vol. 25, No. 3, pp. 235-238.

Andrews, "Interference Cancellation for Cellular Systems: A Contemporary Overview," IEEE Wireless Communications, Apr. 2005, vol. 12, No. 2, pp. 19-29.

Andria et al., "Windows and Interpolation Algorithms to Improve Electrical Measurement Accuracy," IEEE Transactions on Instrumentation and Measurement, Aug. 1989, vol. 38, No. 4, pp. 856-863.

Bliss et al., "MIMO Wireless Communication Channel Phenomenology," IEEE Transactions on Antennas and Propagation, Aug. 2004, vol. 52, No. 8, pp. 2073-2082.

Bliss et al., "Multichannel Multiuser Detection of Space-Time Turbo Codes: Experimental Performance Results," Thirty-Sixth Asilomar Conference on Nov. 3-6, 2002, Signals, Systems & Computers, May 2003, vol. 2, pp. 1343-1348.

Bliss, D.W. and Forsythe, K.W., "Information Theoretic Comparison of MIMO Wireless Communication Receivers in the Presence of Interference," Conference Record of the Thirty-Eighth Asilomar Conference on Nov. 7-10, 2004, Signals, Systems and Computers, Mar. 2005, vol. 1, pp. 866-870.

Burg et al., "A 50 MBPS 4X4 Maximum Likelihood Decoder for Multiple-input Multiple-output Systems with QPSK Modulation", Proceedings of the 10th IEEE Intl. Conference on Electronics, Dec. 14-17, 2003, ICECS, 2003, vol. Nos. 1-3, pp. 332-335.

Burg et al., "VLSI Implementation of MIMO Detection Using the Sphere Decoding Algorithm", IEEE Journal of Solid-State Circuits, Jul. 2005, vol. 40, No. 7, pp. 1566-1577.

Edman and Owall, "A Scalable Pipelined Complex Valued Matrix Inversion Architecture", IEEE International Symposium, May 23-25, Circuits and Systems, Jul. 2005, vol. 5, pp. 4489-4483.

Guo and Nilsson, "A low-complexity VLSI Architecture for Square Root MIMO Detection", Proceedings of the IASTED Intl. Conference on Circuits Signals, and Systems, May 19-21, 2003, pp. 304-309.

Guo and Nilsson, "A VLSI Architecture of the Schnorr-Euchner Decoder for MIMO Systems", IEEE 6th Circuits and Systems Symposium, May 31-Jun. 2, 2004, Emerging Technologies: Frontiers of Mobile and Wireless Communication, Aug. 2004, vol. 1, pp. 65-68.

Karkooti and Cavallaro, "FPGA Implementation of Matrix Inversion Using QRD-RLD Algorithm", Conference record of the Thirty-Ninth Asilomar Conference, Oct. 28-Nov. 1, 2005, Signals, Systems and Computers, Mar. 2006, pp. 1625-1629.

Kim et al., "An efficient FPGA Based MIMO-MMSE Detector," Wireless Integrated Systems Research (WISR) Group , UCLA, 2007, pp. 1131-1135.

La Roche and Roy, "An Efficient Regular Matrix Inversion Circuit Architecture for MIMO Processing", 2006 IEEE International Symposium, ISCAS, Sep. 2006, pp. 4819-4822.

McHenry and Chunduri , "Spectrum Occupancy Measurements Location 3 of 6: National Science Foundation Building Roof", Apr. 16, 2004, Shared Spectrum Company Report, Aug. 15, 2005.

McHenry and Steadman, "Spectrum Occupancy Measurements Location 1 of 6: Riverbend Park, Great Falls, Virginia", Apr. 7, 2004, Shared Spectrum Company Report, Aug. 15, 2005.

McHenry and Steadman, "Spectrum Occupancy Measurements Location 2 of 6: Tyson's Square Center, Vienna, Virginia", Apr. 9, 2004, Shared Spectrum Company Report, Aug. 15, 2005.

McHenry and Steadman, "Spectrum Occupancy Measurements Location 5 of 6: National Radio Astronomy Observatory (NRAO), Green Bank, West Virginia", Oct. 10-11, 2004, Shared Spectrum Company Report, Aug. 15, 2005.

McHenry et al., "Spectrum Occupancy Measurements Location 4 of 6: Republican National Convention, New York City, New York", Aug. 30-Sep. 3, 2004, Shared Spectrum Company Report, Aug. 15, 2005.

McHenry et al., "Spectrum Occupancy Measurements Location 6 of 6: Shared Spectrum Building Roof, Vienna, Virginia", Dec. 15-16, 2004, Shared Spectrum Company Report, Aug. 15, 2005.

Mohammed et al., "Universal MIMO decoder for next generation wireless communication", Poster at annual research review HSSEAS, Feb. 16, 2007.

Myllyla et al., "Complexity Analysis of MMSE Detector Architectures for MIMO OFDM Systems", Thirty-Ninth Asilomar Conference, Oct. 28-Nov. 1, 2008, Signals, Systems and Computers, Mar. 2006, pp. 75-81.

Rife and Vincent, "Use of the Discrete Fourier Transform in the Measurement of Frequencies and Levels of Tones," The Bell System Technical Journal, Feb. 1970, vol. 49, No. 2, pp. 197-228.

S. Nandula and K Giridhar, "Robust Timing Synchronization for OFDM Based Wireless LAN System", Conference on Convergent Technologies for Asia-Pacific Region on Oct. 15-17, 2003, TENCON, Mar. 2003, vol. 4, pp. 1558-1561.

(56) References Cited

OTHER PUBLICATIONS

Schmidl and Cox, "Robust Frequency and Timing Synchronization for OFDM," IEEE Transactions on Communications, Dec. 1997, vol. 45, No. 12, pp. 1613-1621.

Shah, A, Zhu, W, and Daneshrad, B., "Narrowband Interference Mitigation with MIMO Enabled Nodes," (submitted to IEEE Transactions on Wireless Communications).

Steinhardt and Pulsone, "Subband STAP Processing, The Fifth Generation", Sensor Array and Multichannel Signal Processing Workshop held on Mar. 16-17, 2000, Proceedings of the 2000 IEEE, Aug. 2002, pp. 1-6.

Wang et al., "Timing Synchronization for 802.11a WLANs under Multipath Channels," Australian Telecommunications, Networks and Applications Conference, 2003.

Wang, "A Recursive Least-Squares ASIC for Broadband 8×8 Multiple-Input Multiple-Output Wireless Communications", Nov. 2005.

Zhang and Dai, "Cochannel Interference Mitigation and Cooperative Processing in Downlink Multicell Multiuser MIMO Networks," EURASIP Journal on Wireless Communications and Networking, vol. 2004, No. 2, pp. 222-235.

Office Action dated Sep. 26, 2011, U.S. Appl. No. 12/333,225.

\* cited by examiner

INTERFERENCE MITIGATION FOR DEVICES WITH MULTIPLE RECEIVERS

CROSS-REFERENCE TO RELATED APPLICATIONS

This application claims the benefit under 35 U.S.C. §119(e) of U.S. Provisional Application No. 61/061,575, entitled "Interference mitigation with MIMO-enabled nodes," filed Jun. 13, 2008, the entire contents of which are incorporated by reference herein and made part of this specification. This application is related to U.S. application Ser. No. 12/333,225, entitled "Interference mitigation for devices with multiple receivers," concurrently filed with this application, the entire contents of which are also incorporated by reference herein.

BACKGROUND

1. Field

This disclosure relates generally to communication systems and, more particularly, to systems and methods for mitigating interference in a wireless communication system.

2. Description of the Related Art

The goal of a communications system is to transmit information from one time or place to another time or place. Accomplishing this goal is made difficult by the presence of other signals, such as noise and/or interference. Various methods of communicating in the presence of noise and/or interference have been developed, including the use of multiple transmitters and/or multiple receivers at one or more of the communicating devices. Certain existing communications system standards suffer from various drawbacks such as, for example, a lack of effective and constructive methods for compensating for interference or certain types of noise.

SUMMARY

One aspect of the development is a method of demodulating a received signal in a communication system, the method having the operations of receiving a first plurality of waveforms, estimating a covariance matrix based on the first plurality of waveforms, determining a spatial filter based on the estimated covariance matrix, receiving a second plurality of waveforms, generating at least one filtered waveform by applying the spatial filter to the second plurality of waveforms, and demodulating the at least one filtered waveform.

Another aspect of the development is a system for demodulating a received signal in a communication system, the system having a plurality of antennas configured to receive a first plurality of waveforms and a second plurality of waveforms, a processor operatively connected to the system, a computer-readable medium encoded with instructions executable by the processor, the instructions configured to cause the processor to estimate a covariance matrix based on the first plurality of waveforms, determine a spatial filter based on the estimated covariance matrix, generate at least one filtered waveform by applying the spatial filter to the second plurality of waveforms, and demodulate the at least one filtered waveform.

Another aspect of the development is a system for demodulating a received signal in a communication system, the system having a receiver for receiving a first plurality of waveforms, an estimator for estimating a covariance matrix based on the first plurality of waveforms, a microprocessor for determining a spatial filter based on the estimated covariance matrix, a receiver for receiving a second plurality of waveforms, a filter for generating at least one filtered waveform by applying the spatial filter to the second plurality of waveforms, and demodulator for demodulating the at least one filtered waveform.

Still another aspect of the development is a programmable storage device having code which, when executed, causes a processor to perform a method of demodulating a received signal in a communication system, the method comprising receiving a first plurality of waveforms, estimating a covariance matrix based on the first plurality of waveforms, determining a spatial filter based on the estimated covariance matrix, receiving a second plurality of waveforms, generating at least one filtered waveform by applying the spatial filter to the second plurality of waveforms, and demodulating the at least one filtered waveform.

A further aspect of the development includes a method of estimating a covariance matrix in a communication system, the method comprising i) obtaining a plurality of waveforms, the plurality of waveforms associated with a reception time, ii) determining if a packet was detected during the reception time, iii) determining if an automatic gain control setting has changed during the reception time, and iv) estimating a covariance matrix based on the plurality of waveforms, wherein if it is so determined that a packet is detected during the reception time or an automatic gain control setting has changed during the reception time, at least operations i)-iii) are repeated.

Another aspect of the development includes an interference mitigation module in a communication device, the module having an input configured to obtain a plurality of waveforms, the plurality of waveforms associated with a reception time, a covariance estimation module configured to estimate a covariance matrix based on the plurality of waveforms, a spatial filter module configured to determine a spatial filter based on the estimated covariance matrix, and a controller configured to determine if whether a packet was detected during the reception time or an automatic gain control setting has changed during the reception time, wherein the spatial filter module determines a spatial filter when a packet is not detected during the reception time or an automatic gain control setting has not changed during the reception time.

Yet another aspect of the development includes a method of estimating a covariance matrix in a communication system, having operations of receiving a first packet during a first reception time, receiving a second packet during a second reception time, receiving a waveform during an interframe spacing, wherein the interframe spacing is between the first and second reception time, and estimating a covariance matrix based on the received waveform.

Yet another aspect of the development includes a method of estimating a covariance matrix in a communication system, the method comprising receiving a first plurality of waveforms, and beginning a covariance estimation procedure to generate an estimated covariance matrix based on the first plurality of waveforms, wherein beginning the covariance estimation procedure occurs upon the earlier of a time when an estimation stimulus is detected or after a first predetermined amount of time is elapsed.

Still a further aspect of the development is a programmable storage device comprising code which, when executed, causes a processor to perform a method of estimating a covariance matrix in a communication system, the method having i) obtaining a plurality of waveforms, the plurality of waveforms associated with a reception time, ii) determining whether a packet was detected during the reception time, iii) determining whether an automatic gain control setting has changed during the reception time, and iv) estimating a covariance matrix based on the plurality of waveforms, wherein at least operations i)-iii) are repeated when a packet is detected during the reception time or an automatic gain control setting has changed during the reception time.

DETAILED DESCRIPTION

Introduction

As discussed above, the goal of a communications system is to transmit information from one time or place to another time or place. Accomplishing this goal is made difficult by the presence of other signals, such as noise and/or interference. Various methods of communicating in the presence of noise and/or interference have been developed, including the use of multiple transmitters and/or multiple receivers at one or more of the communicating devices. For example, IEEE 802.11n is a proposed amendment to the IEEE 802.11-2007 wireless networking standard to significantly improve network throughput over previous standards, such as 802.11b and 802.11g, by using a multiple-input/multiple-output (MIMO) system. Certain existing communications system standards suffer from various drawbacks such as, for example, a lack of effective and constructive methods for compensating for interference or certain types of noise.

Signals received by a communication device can nominally be decomposed into two components: 1) a signal of interest and 2) other signals, including noise and interference. The signal of interest includes information another device is transmitting that the receiver wishes to receive, often transmitted in the form of data packets, or simply "packets." The rest of the signal includes noise or interference. Interference results when other devices transmit information that the receiver does not wish to receive, or when a malevolent device (such as a jammer) transmits interfering signals containing no information.

Figure 1:
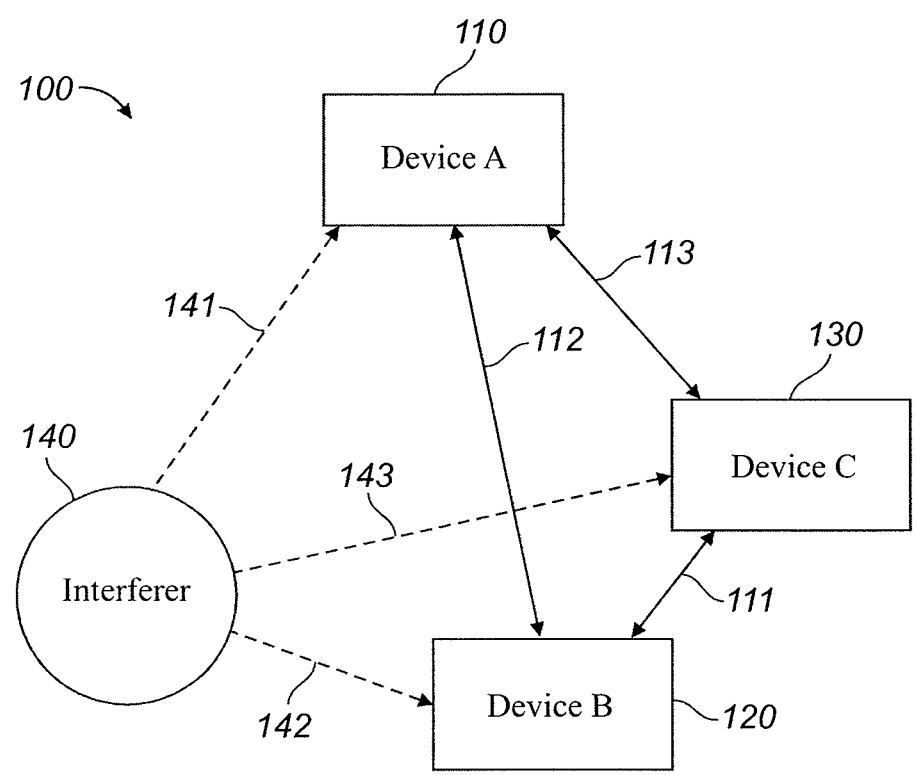
FIG. 1 is a block diagram of a wireless communication network with an interferer.

FIG. 1 is a block diagram of a wireless communication network with an interferer (or jammer). The wireless communication network 100 comprises three communication devices 110, 120, 130 in data communication with each other over a number of channels 111, 112, 113. When the first device 110, labeled Device A, transmits information to the second device 120, labeled Device B, over a wireless channel 112, the second device 120 receives both the transmitted information and noise. Noise sources in wireless data communication include, but are not limited to, background radiation, thermal noise, electronic noise, etc. The second device 120 can also receive a signal from an interferer 140 over another wireless communication channel 142. The interferer 140 may, for example, be attempting to transmit information to the third device 130, labeled Device C, be transmitting information within another wireless communication network, or transmitting a jamming signal to interfere with the network. Although the interferer 140 may be transmitting information, from the point of view of the second device 120, the interferer 140 is a noise source.

The unlicensed nature of the ISM (Industrial, Scientific, and Medical) bands have allowed for rapid development of various wireless communication technologies and standards such as Bluetooth, which uses the 2450 MHz ISM band, and IEEE 802.11, which uses the 2450 and 5800 MHz ISM bands. Because communication devices using the ISM bands must tolerate interference from other equipment, these bands are typically given over to uses intended for unlicensed operation, since unlicensed operation typically needs to be tolerant of interference from other devices anyway. Interference becomes an issue as devices are allowed to operate in the same band without pre-determined frequency, temporal, or spatial planning. There have been several attempts to mitigate this issue via higher layer protocols. For example, methods involving cooperative scheduling have been implemented to turn portions of the random access channel into a controlled access channel. Also, some work has been done to show that time domain signal processing can be used to mitigate the effects of narrowband interference. While these methods may, in certain circumstances, be effective, they may also be computationally intensive. Each of these methods has been primarily developed for Single-Input/Single-Output (SISO) systems, and there has been very little work done to mitigate interference in receivers with multiple antennas.

The use of multiple antennas is motivated in part by the fact that the channel capacity of the resultant channel can scale linearly with the number of transmitters/receivers. Multiple-Input/Multiple-Output (MIMO) antenna systems also provide the user with additional degrees of freedom over traditional single antenna (SISO) systems to enable optimum transmission and compensate for in-band interference in scatter rich environments.

Figure 2:
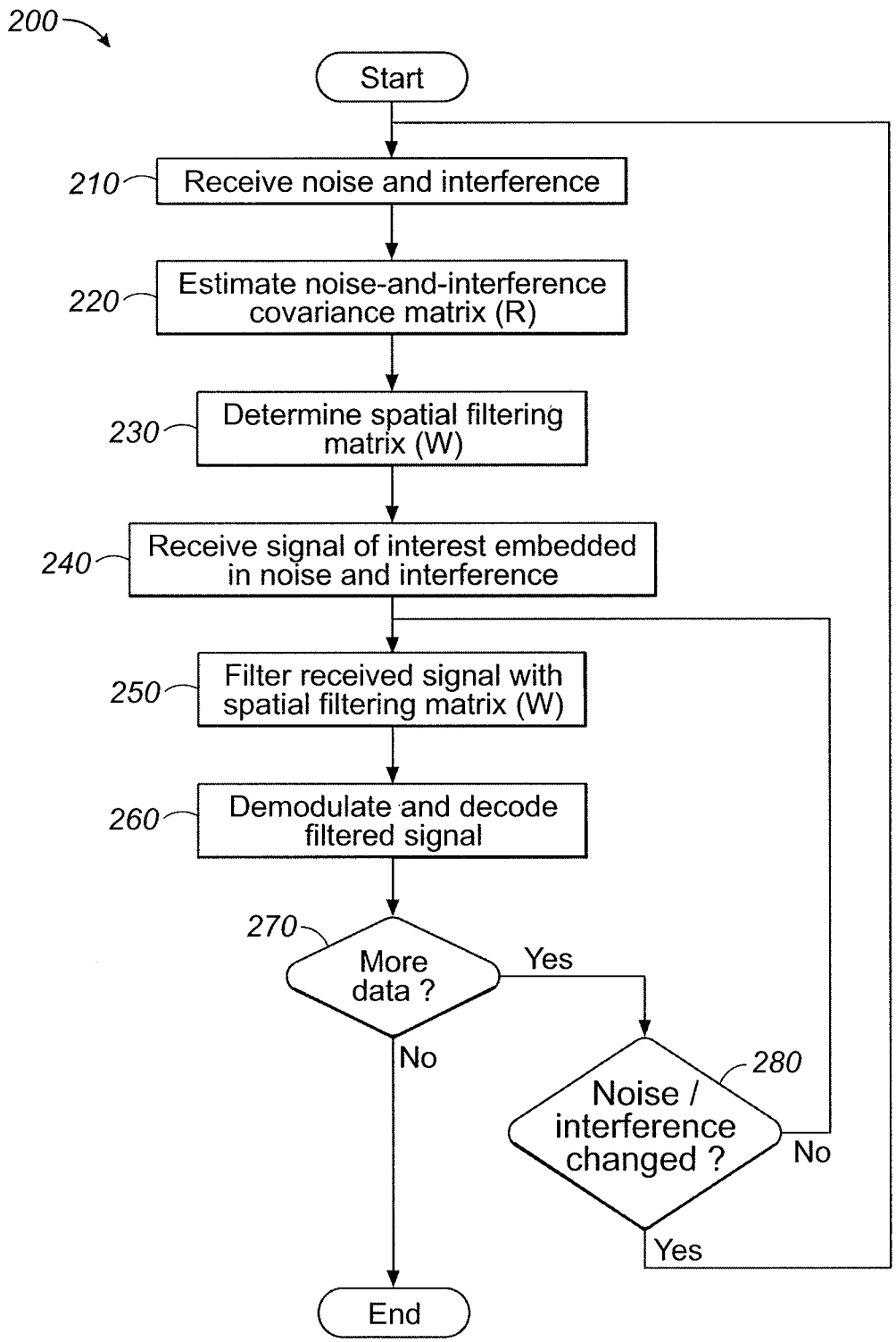
FIG. 2 is a flowchart illustrating a method of mitigating interference in a wireless communication network.

FIG. 2 is a flowchart illustrating a process 200 for mitigating interference in a wireless communication network using multiple antennas. The process 200 for mitigating interference can be performed, for example, by a receiving device. In block 210, the process begins by receiving a noise-and-interference signal comprising at least noise component and an interference component. It is preferable that the noise-and-interference signal not comprise a component corresponding to the signal of interest; however, the scope of the invention is not so-limited. In some embodiments, the noise-and-interference signal is further processed to identify the separate noise and/or interference components from other components. The noise-and-interference signal can be received on a number of different antennas; therefore, the noise-and-interference signal can include multiple sub-signals, each sub-signal corresponding to a single antenna. Reception of the noise-and-interference signal can be performed prior to the transmission of the signal of interest by a transmitting device, or can be received in between transmissions by the transmitting device.

In block 220, the covariance matrix of the noise-and-interference signal is estimated. The noise-and-interference covariance matrix (R) can be estimated using a number of suitable methods. For example, the noise-and-interference signal can be decomposed in time into a number of shorter sub-signals. The outer product of each of these sub-signals can then be taken and averaged to form an estimate of the noise-and-interference covariance matrix (R). In other embodiments, the noise-and-interference signal can be decomposed in frequency, e.g., via a suitable transform such as the Fourier transform. In block 230, a spatial filtering matrix (W) is computed, or otherwise derived, based on the estimated noise-and-interference covariance matrix (R). The spatial filtering matrix (W) is, in some embodiments, a multi-antenna filter. A number of methods for determining the spatial filtering matrix are disclosed herein, including eigenvector nulling, noise whitening, covariance matrix inversion, and covariance matrix inversion with diagonal loading.

In block 240, a communication signal is received, the communication signal including the signal of interest, noise, and interference. As described above with respect to the noise-and-interference signal, the communication signal can be received on a number of antennas, and therefore can include multiple sub-signals, each sub-signal corresponding to a single antenna. In other embodiments, the signal of interest, embedded in noise and interference, is received, before the noise-and-interference signal. In general, in different embodiments of the method, the steps performed in the blocks of FIG. 2 can be performed in different orders. In block 250, the spatial filtering matrix (W) is applied to the communication signal to produce a filtered communication signal. Application of the spatial filtering matrix (W) to the communication signal can be a matrix-vector multiplication performed by software running in a microprocessor. Alternatively, application of the spatial filtering matrix can be accomplished using hardware such as an adaptive filter. Other suitable techniques for applying the spatial filtering matrix can be used. The filtered communication signal is then, in block 260, demodulated and/or decoded according to standard methods.

In block 270, it is determined if there is more data to be received. If not, the process 200 ends. If there is more data to be received, the process moves to block 280, where it is determined whether the noise-and-interference signal has changed. In some embodiments, when an analog gain control (AGC) gain has changed, it is determined that the noise-and-interference signal has changed. Other methods of determining a change in the noise-and-interference signal can also be used. When it is determined that the noise-and-interference signal has changed, the process restarts at block 210. However, when it is determined that the noise-and-interference signal is substantially the same, the process returns to block 240 to receive further communication signals. Some embodiments of the process lack block 280 and always return to block 210 when more data is to be received.

Receiver Configuration

Figure 3:
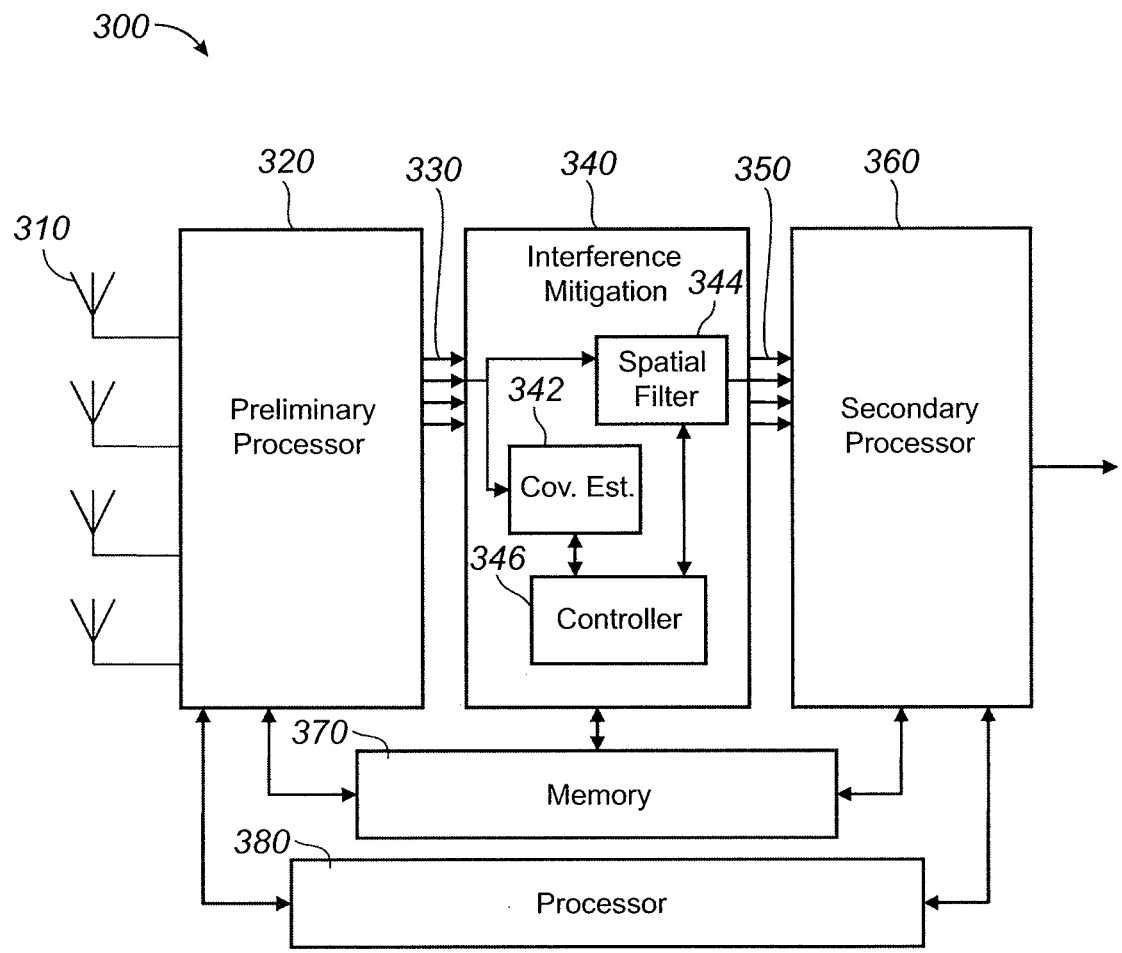
FIG. 3 is a functional block diagram of a receiver in a wireless communication network.

FIG. 3 is a functional block diagram of a receiver having an interference mitigation module. The receiver 300 can implement the procedure 200 described above and/or other interference mitigation procedures. The receiver 300 includes a number of antennas 310. Without limiting the number, the receiver can have two, three, four, or more than four antennas. In some embodiments, the antennas are configured for both reception and transmission of signals, whereas in other embodiments, the antennas are only configured for receiving signals. In some embodiments, the receiver 300 can have a different number of transmitting antennas than receiving antennas. The antennas are electrically coupled to a preliminary processor 320.

The receiver includes both a preliminary processor 320 and a secondary processor 360. The preliminary processor 320 can include mechanisms for processing received signals prior to interference mitigation, and the secondary processor 360 typically includes mechanisms for processing the filtered communication signal. The preliminary processor 320 can include modules for analog gain control (AGC), spatial, temporal, or frequency-based filtering, such as bandpass or half-band filtering, and/or performing a Fourier or inverse Fourier transform. The secondary processor 360 can include modules such as a demodulation module, a Fourier transform or inverse Fourier transform module, a decoder module for decoding signals coded using an error-corrective code such as a Hamming code, a convolutional code, a turbo code, or a low-density parity check (LDPC) code, a deinterleaving module, and a demultiplexer. In other embodiments, modules which are listed as being associated with the secondary processor 360 can be included in the preliminary processor 320.

The receiver also includes an interference mitigation module 340 which receives data from the preliminary processor 320 over a data link 330, performs an interference mitigation procedure on the data received from the preliminary processor 320, and then transmits the filtered data to the secondary processor 360 over a data link 350. The interference mitigation module 340 can include a number of sub-components, as discussed in detail below.

The receiver can also include a microprocessor 370 and a memory 380. The microprocessor can be used by any of the other components, such as the primary processor 320, the interference mitigation module 340, or the secondary processor 360 to perform data calculations. As used herein, the term "processor" refers broadly to any suitable device, logical block, module, circuit, or combination of elements for executing instructions. The microprocessor 370 can be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processor can be any conventional special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor, such as microprocessor 370 can be a conventional microprocessor, but in the alternative, the microprocessor 370 can be any conventional processor, controller, microcontroller, or state machine. Microprocessor 370 can also be implemented as a combination of computing devices, e.g., a combination of a DSP and a microprocessor, a plurality of microprocessors, one or more microprocessors in conjunction with a DSP core, or any other such configuration.

The memory 380 can also be connected to the other components of the receiver, such as the preliminary processor 320, the interference mitigation module 340, the secondary processor 360 and the microprocessor 370. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), which are directly connected to the one or more processors of the receiver 300. Other types of memory include bubble memory and core memory.

The interference mitigation module 340 comprises a number of sub-components, including a covariance estimation submodule 342, a spatial filter submodule 344, and a controller 346. The covariance estimation submodule 342 and spatial filter submodule 344 both receive data from the preliminary processor 320 over the data link 330. Both the covariance estimate submodule 342 and the spatial filter submodule 344 are electrically coupled to the controller 346 which controls the functions of the submodules.

The covariance estimation submodule 342 receives signals from the antennas 310 via the preliminary processor 320 and estimates the covariance of the received signal. As described above, in one embodiment, the covariance estimation submodule temporally splits the received signal into a number of sub-signals and averages the outer product of the sub-signals.

The spatial filter submodule 344 both generates and applies a spatial filter to signals received from the antennas via the preliminary processor 320, such as the communication signal comprising the signal of interest embedded in noise and interference. In some embodiments of the receiver 300, the generation and application of the spatial filter are performed in separate modules. For example, in one embodiment the generation of the spatial filter is performed by the microprocessor 380. In other embodiments, a dedicated spatial filter generation module can be distinct from a spatial filter application module. Once the noise-and-interference covariance matrix (R) has been estimated, e.g., by the covariance estimation submodule 342, there are several methods that can be used to generate a spatial filtering matrix (W). Methods disclosed herein include eigenvector nulling, noise whitening, covariance matrix inversion, and covariance matrix inversion with diagonal loading. Other methods of generating the spatial filtering matrix can also be used.

As mentioned above, there are a number of methods for generating a spatial filtering matrix (W) based on the estimated noise-and-interference covariance matrix (R). One such method, eigenvector nulling (or simply eigen nulling), involves placing a null in the direction of the strongest eigenmode. One method of doing this involves taking a eigendecomposition or singular value decomposition (SVD) of the estimated noise-and-interference covariance matrix (R) and replacing the strongest eigenvector corresponding to the largest eigenvalue with the all-zeroes vector. The singular value decomposition theorem states that any matrix, such as the estimated noise-and-interference covariance matrix (R), can be factored as follows:

$$R = U\Sigma V^*,$$

where U and V are unitary matrices, and $\Sigma$ is an matrix with non-negative values along its diagonal. Assuming that R is a 4×4 matrix, corresponding to a receiver 300 with four antennas 310, this can further be written as:

$$R = U\Sigma V^* = [[u_1][u_2][u_3][u_4]] \begin{bmatrix} \sigma_1 & & & \\ & \sigma_2 & & \\ & & \sigma_3 & \\ & & & \sigma_4 \end{bmatrix} \begin{bmatrix} [v_1] \\ [v_2] \\ [v_3] \\ [v_4] \end{bmatrix}^*,$$

where $u_1$, $u_2$, $u_3$, and $u_4$ are eigenvectors, and $\sigma_1$, $\sigma_2$, $\sigma_3$, and $\sigma_4$, are the singular values. The singular values are sorted such that $\sigma_1 > \sigma_2 > \sigma_3 > \sigma_4$.

The spatial filtering matrix (W) can be derived from the matrix U, by replacing the leftmost column with the all-zeros vector and conjugating the result. Thus, in some embodiments, $$W = [[0][u_2][u_3][u_4]]^*.$$

Eigenvector nulling has shown to be very effective when the interference power is high. It places a harsh null in the direction of the strongest eigenmode. However, as the interference power approaches the noise floor, the harshness of the null may be detrimental to the performance. This may result from the main lobe of the strongest eigenmode becoming distorted by the noise. This may also result in the sidelobes being larger. When the noise power is within 10 dB of the interference power, the covariance matrix may be less likely to optimally identify the interference source with its strongest eigenvector. This may cause suboptimal nulling and, in some cases, may hinder performance. Heuristic schemes can be derived to disable interference mitigation using eigenvector nulling when the interference power is low.

Another method of interference mitigation is noise whitening. Noise whitening (or simply whitening) involves using the square root of the inverse of the estimated noise-and-interference covariance matrix as the spatial filter. The noise whitening approach provides an output signal with substantially uncorrelated noise. A drawback of this approach is that, in some applications, it can potentially amplify the noise. Preferably, the interference mitigation method should suppress the interference power more than it amplifies then noise power.

Simulations have shown circumstances in which the noise whitening approach was unable to sufficiently suppress the interference power, and provided only a marginal improvement when compared to results with no interference mitigation at all. An alternative approach is to skip the square root and use the inverse directly. This method, referred to a covariance matrix inversion (or nulling), results in a suppression of the interfering signal which is much higher, with the drawback that the residual noise will be correlated. Since the residual interference power may in some circumstances be the limiting factor for performance, the reduction in its power may be more beneficial than the lack of whiteness in the noise signal.

Mathematically, the spatial filter (W) for noise whitening can be written as follows:

$$W = [[u_1][u_2][u_3][u_4]] \begin{bmatrix} \frac{1}{\sqrt{\sigma_1}} & & & \\ & \frac{1}{\sqrt{\sigma_2}} & & \\ & & \frac{1}{\sqrt{\sigma_3}} & \\ & & & \frac{1}{\sqrt{\sigma_4}} \end{bmatrix} \begin{bmatrix} [v_1] \\ [v_2] \\ [v_3] \\ [v_4] \end{bmatrix}^*$$

The spatial filter (W) for nulling can be written as follows:

$$W = [[u_1][u_2][u_3][u_4]] \begin{bmatrix} \frac{1}{\sigma_1} & & & \\ & \frac{1}{\sigma_2} & & \\ & & \frac{1}{\sigma_3} & \\ & & & \frac{1}{\sigma_4} \end{bmatrix} \begin{bmatrix} [v_1] \\ [v_2] \\ [v_3] \\ [v_4] \end{bmatrix}^*.$$

Inadequate estimation of the covariance matrix can lead to large sidelobes and a distorted mainlobe in the spatial gain pattern of the receiver 300. In order to mitigate these effects, diagonal loading can be applied to the estimated noise-and-interference covariance matrix prior to taking the inverse as described above. This method has been shown to improve the stability of the resulting inverse. Diagonal loading involves adding a value to each diagonal element of the estimated noise-and-interference covariance matrix. This improves the rank of the estimated noise-and-interference covariance matrix and the spatial gain pattern of the inverse that is calculated. One may see the greatest benefit from this technique when the interference power is close to the noise power. Diagonal loading reduces the depth of the nulls that are created. The diagonal loading added to the estimated noise-and-filter covariance can be based on the noise power and can be any fraction of or greater than the noise power.

Other methods, such as methods based on combinations of the teachings of the disclosed embodiments, can also be used to determine the spatial filter (W). The spatial filter (W) can be based, at least in part, on the estimated noise-and-interference covariance matrix (R). The spatial filter (W) can also or instead be based on a different covariance matrix, such as the covariance matrix of the communication signal or a predetermined noise-and-interference covariance matrix.

As stated above, both the covariance estimation submodule 342 and the spatial filter submodule 344 are provided to the controller 346 which controls the functions of the submodules. The controller 346 is, in some embodiments, responsible for coordinating the transmission and reception of data (such as matrices) between components of the receiver 300. It can also be responsible for ensuring that the noise-and-interference covariance matrix is not estimated while the signal of interest is being transmitted. Finally, the controller 346 may also ensure that the spatial filtering matrix is not updated while the receiver 300 is decoding a packet.

In order to prevent estimation of the covariance matrix while the signal of interest is in transit, a protocol may be used that provide times when the channel between two devices is free of a signal-of-interest component. For example, by guaranteeing an interframe spacing (IFS), the protocol can ensure that the receiver 300 has enough time to estimate the noise-and-interference covariance matrix between packets. In some embodiments, a protocol guarantees an IFS of at least 1 microsecond, about 50 microseconds, between 10 and 100 microseconds, or another suitable IFS that provides enough time for covariance matrix estimation to occur. The controller 346 can also keep track of settings from within the preliminary processor 320, such as the gain setting of an analog gain control unit. If the gain changes during an estimation period, this can be factored into the estimation of the noise-and-interference covariance matrix. In one embodiment, the estimation is restarted. In other embodiments, the data is weighted according to the gain setting at the time of recording, but this is complicated by the transient dynamics of the analog gain control unit. While estimating the covariance of the noise-and-interference signal, key control signals from the receiver 300 can also be observed, such as a control signal indicating a packet has been detected.

In order to have a robust interference mitigation subsystem another protocol for handling loss of synchronization with the transmitter has been developed. If the covariance matrix is estimated while the signal of interest is being transmitted, or if the covariance estimate is otherwise faulty, the signal of interest could potentially be removed. To prevent this failure condition, a timeout period is used as a failsafe mechanism. If no packet is detected after a given amount of time, the controller 346 can enter a timeout state. While in this state the controller 346 waits for a fixed period of time between computing estimates of the noise-and-interference covariance. The microprocessor 380 can continue to process the covariance estimates and return filtering matrices. The controller 380 can continue to operate in timeout mode until another packet is detected. The amount of time required to recover from this type of failure depends on the ratio of the length of the packet (in microseconds) and the length of the interframe spacing. If the transmission times are chosen randomly then the probability of n successive failed covariance estimates is given by the equation below.

$$P_{fail} = \frac{T_{packet}}{T_{IFS} - T_{estimation}}$$

$$P_{failed\_covariance} = P_{fail}^n, n = \text{trials}$$

$$P_{succesful\_covariance} = 1 - P_{failed\_covariance} = 1 - P_{fail}^n$$

Figure 4:
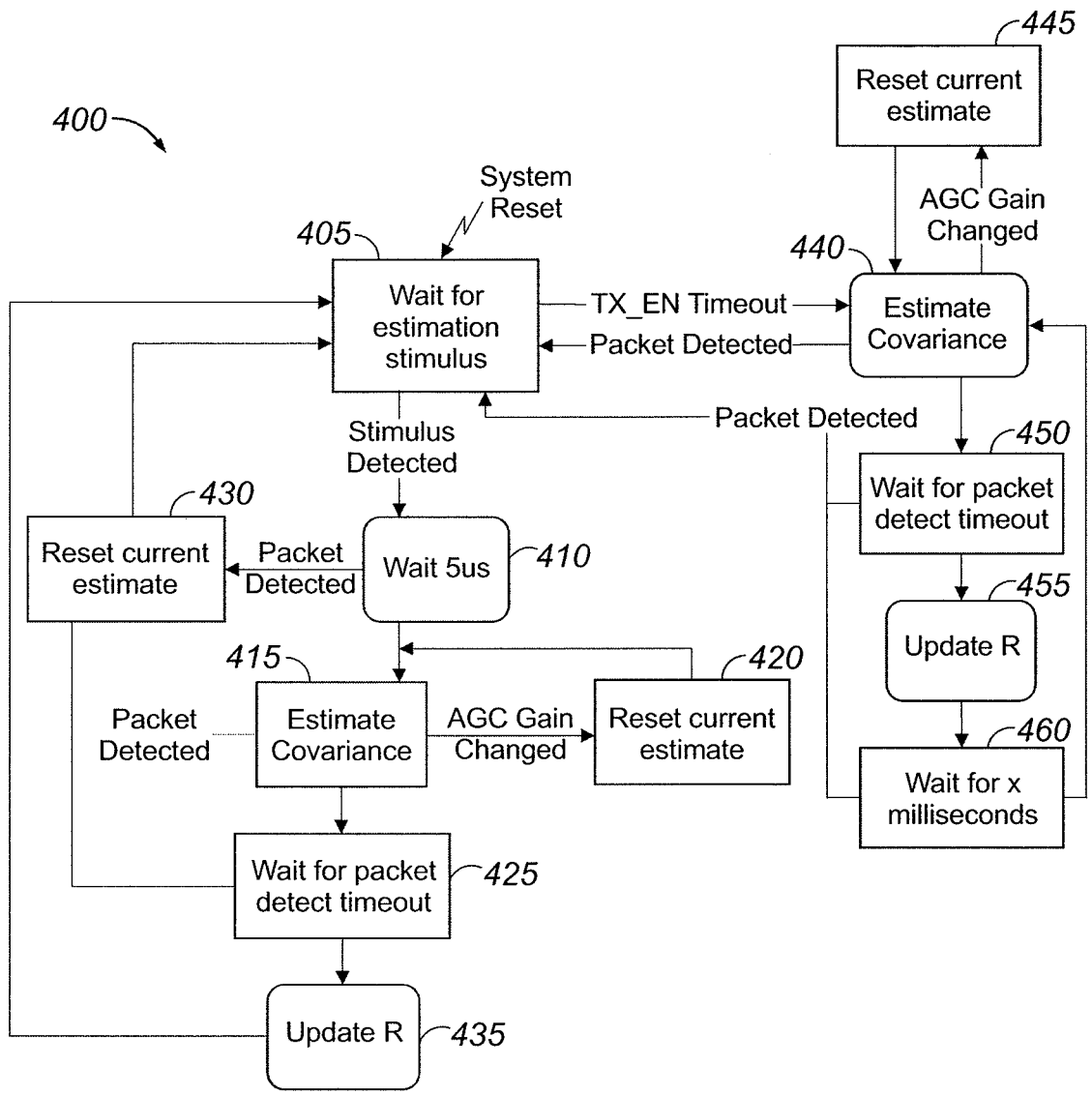
FIG. 4 is a state diagram illustrating a method of controlling an interference mitigation module.

The state diagram of embodiment of a controller 346 that performs all of these operations is shown in FIG. 4. The oval states are the states during which the controller 346 allows for updating of the spatial filtering matrix from the microprocessor 380. The states labeled "Update R" are the states during which the controller 346 can pass a new matrix to the microprocessor 380. This state machine ensures the covariance matrix is computed during interframe spacings without fluctuations from the analog gain control unit. It also ensures that the spatial filtering matrix is not updated while a packet is being decoded, e.g., by the secondary processor 360.

The controller 346 begins in state 405, in which it waits for an estimation stimulus. The estimation stimulus is any event recognizable by the controller 346 to trigger estimation of the covariance matrix. The estimation stimulus can be derived from a waveform received on the antennas 310, or the estimation stimulus can be a control signal from the microprocessor 380. For example, the event can be the detection of a packet, or the detection of a packet with specific information in a header thereof. Alternatively, the event can be the reception of a signal from the microprocessor 380 indicating that estimation of the covariance matrix should occur. The microprocessor 380 can determine when to transmit such a signal based on any of a number of factors, such as when a packet has been detected or when it is determined that packets are no longer being detected. Once the stimulus is detected, the controller 346 moves to state 410 in which it waits a certain amount of time, such as, for example, a predetermined amount of time sufficient to ensure the channel is free of a signal-of-interest component, e.g., at least 1 microsecond, between about 1 microsecond and about 100 microseconds, 5 microseconds, an amount of time determined algorithmically, or another suitable amount of time, before moving to state 415. The controller 346 can be configured to wait another suitable amount of time before moving to state 415. In state 415, the controller 346 instructs the covariance estimation submodule 342 to estimate the noise-and-interference covariance matrix based on a received waveform. The waveform can be associated with a reception time, e.g., the period of time over which the waveform was received on the antennas 310. Due to finite processing speed, the time at which the covariance matrix submodule 342 obtains the waveform can be different from the reception time, which corresponds to when the waveform is received on the antennas 310. If the controller 346 determines that the analog gain control setting has changed during the reception time, the controller 346 can reset the current estimate in state 420 and instruct the covariance estimation submodule 342 to restart estimation of the noise-and-interference covariance matrix based on a new waveform with a new reception time. Similarly, if the controller 346 determines that a packet has been detected during the reception time, the controller 346 can reset the current estimate of the covariance matrix in state 430.

Once the noise-and-interference covariance matrix is estimated, the controller 346 enters an idle state 425 in which it waits to detect a packet or to timeout. Due to finite processing speed, there is a delay between the reception time of the waveform and when a packet is detected in the waveform. Thus, the controller waits an appropriate delay or interval before determining that a packet (or signal of interest component) is not present in the received waveform on which the covariance matrix estimate is based. If a packet is detected during idle state 425, the controller enters a state 430 in which the noise-and-interference covariance matrix is reset. If the controller 346 times out from state 425, it enters a state 435 in which it instructs the microprocessor 380 or the spatial filter module 344 to update the spatial filtering matrix. Both states 430 and 435 return the controller 346 to the start state 405.

If an estimation stimulus is not detected, or if a faulty estimation occurs, as described above, the controller 346 enters a state 440 in which it instructs the covariance estimation submodule 342 to estimate the noise-and-interference covariance matrix based on a received waveform associated with a reception time. As above, if the controller 346 detects that the analog gain control settings have changed during the reception time, the controller 346 resets the current estimate in a reset state 445 and instructs the covariance estimation submodule 342 to restart estimation of the noise-and-interference covariance matrix based on a new received waveform with a new reception time. If the controller 346 determines that a packet has been detected during the reception time, the controller 346 returns to the start state 405.

After the noise-and-interference covariance matrix has been estimated, the controller 346 enters an idle state 450 in which it waits to detect a packet or timeout. If a packet is detected, the controller returns to the start state 405. If the controller 346 times out from state 450, it enters a state 455 in which it instructs the microprocessor 380 or spatial filter module 344 to update the spatial filtering matrix before changing to a state 460 in which the controller 346 waits an amount of time before returning to the start state 405.

Simulation and Implementation

The systems and methods disclosed above can be implemented using suitable hardware, software, and/or a combination of hardware and software. A discussion of the results of empirical tests using the above-discussed systems and methods is now presented.

A simulation of the systems and methods disclosed herein was performed using a model of a transmitter compliant with the current IEEE 802.11n standard, channel models disclosed by the IEEE 802.11 standard, and a model of the receiver as discussed above. The simulation was performed using MATLAB produced by The MathWorks, Inc. The transmitted data was randomly generated and encoded with a rate ½ convolutional code ($133_8$, $171_8$). In cases where the transmission scheme called for more than one spatial stream, the encoded data was spread across the streams in a systematic manner to take advantage of spatial diversity.

The encoded data on each spatial stream was then interleaved and mapped into a quadrature amplitude modulation (QAM) constellation. The interleaver depth was matched to the number of encoded bits that was modulated onto each orthogonal frequency division multiplex (OFDM) symbol. The constellation used in the simulation was 16-QAM. Each of these constellation points was used to modulate 52 data subcarriers in the OFDM system. The modulation was performed with a 64-point FFT (Fast Fourier Transform), after which the resulting signal was extended with a 16 sample cyclic prefix. When added to a OFDM modulation scheme, the cyclic prefix helps combat the effects of a multipath channel and reduces inter-carrier interference. The resulting OFDM symbols were then windowed and concatenated to generate the data payload of the transmitted packet, which was sampled at 20 MHz.

In order to test the performance of some of the disclosed multi-antenna interference mitigation algorithms disclosed above, simulations were performed in which single tone jammer was randomly placed in the band of interest. Both the jammer and the transmitted packet were passed through spatial channels and combined at the receiver. The resultant signal was subjected to an interference mitigation algorithm and demodulated and decoded according to current standards.

The transmitted signal and the interfering source were convolved with randomly generated channels. These channels were modeled after the channels described in the IEEE 802.11 TGn Draft proposal, in which channels A, B, and D were used. Channel A is a signal-tap Rayleigh flat fading channel, channel B is a frequency-selective channel with 15 ns rms delay spread, and channel D is a frequency-selective channel with 50 ns rms delay spread. These channels are typical of what would be seen in a home environment. In some embodiments, the amount of delay spread has a dramatic affect on the performance of the system.

The transmitted waveform was an 802.11n compliant OFDM signal. Thus, it used the same short and long training sequences for time and frequency synchronization. In the simulation, an HT (High Throughput) mixed mode packet format was used for all packets. Channel estimation was done using the HT long training sequences. The data payload of the packets was 100 bytes.

A quiet period was inserted before each packet which the receiver used to estimate the noise-and-interference covariance matrix (R). The estimation was performed using 1000 samples. Once the noise-and-interference covariance matrix (R) had been estimated, various method were used to generate the spatial filtering matrix (W). The received signal ($y_{dirty}$) was multiplied by spatial filtering matrix (W) to generate the filtered version of the signal ($y_{clean} = W y_{dirty}$). The filtered signal was then passed into a standard-compliant 802.11n receiver. The decoded data was compared with the transmitted data to determine if the packet was received correctly. Packet error rate is calculated based on the output of the receiver.

As an initial measure of performance, simulations were performed to investigate the gain in SINR. To perform this measurement, instead of combining the data signal and the interference signal, the spatial filtering matrix was applied to each signal individually. The signal power and interference power were measured before and after the application of the spatial filtering matrix. The ratio of these powers was averaged over 1000 trials. The signal-to-interference ratio (SIR) was swept from −20 dB to +15 dB for channels A, B, and D at a signal-to-noise ratio (SNR) of 10 dB, 15 dB, 20 dB, and 25 dB.

Figure 5A:
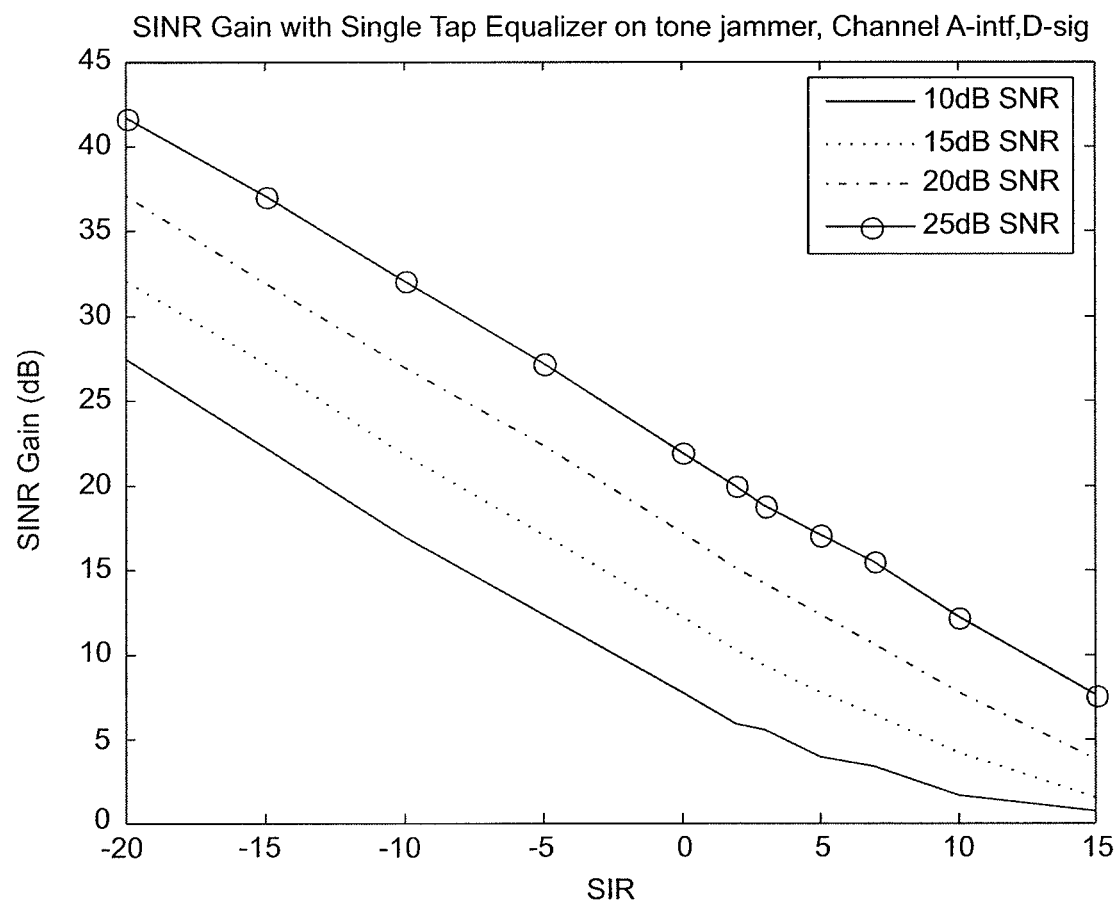
FIGS. 5A-5L are plots of the simulated signal-to-noise-plus-interference ratio (SINR) gain of various channels using a various interference mitigation methods.
Figure 5B:
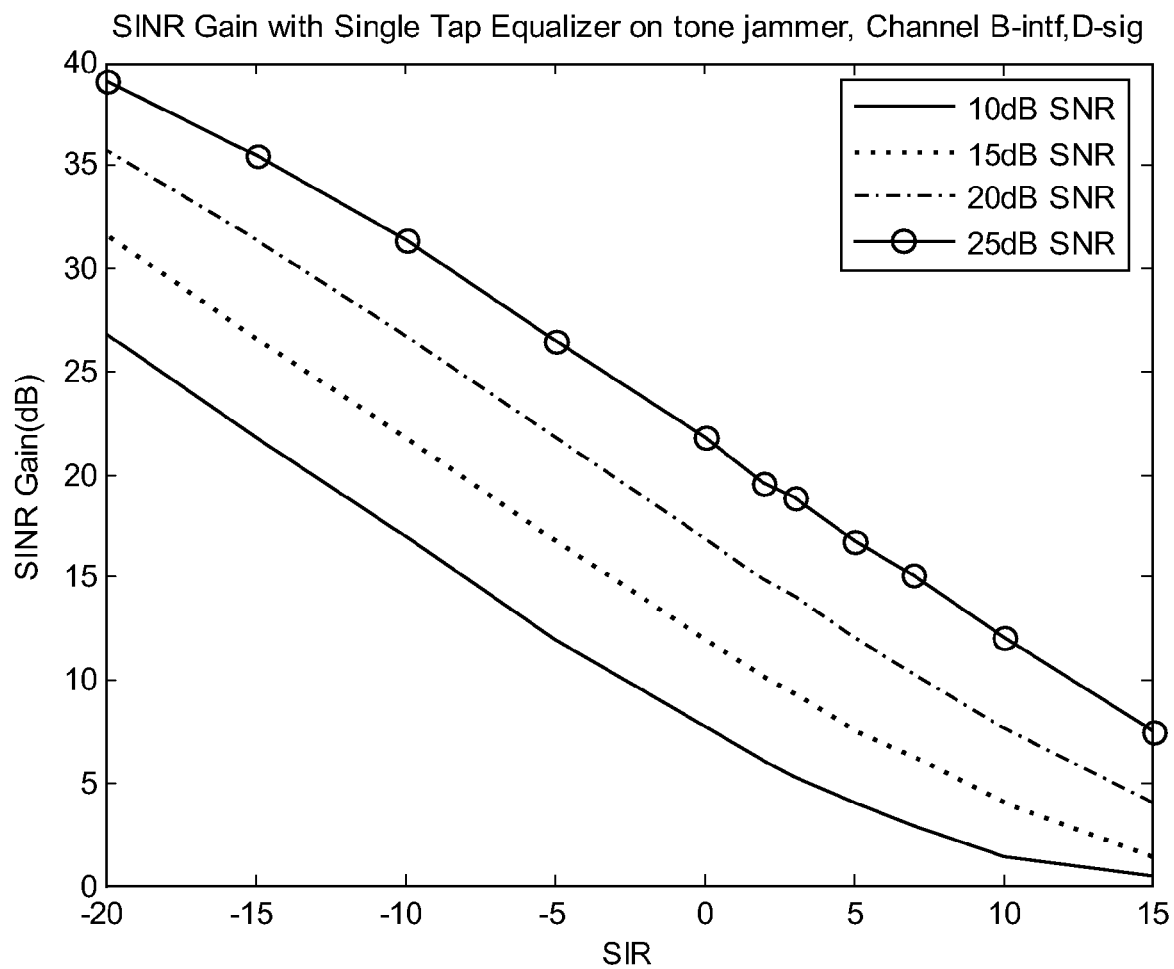
Figure 5C:
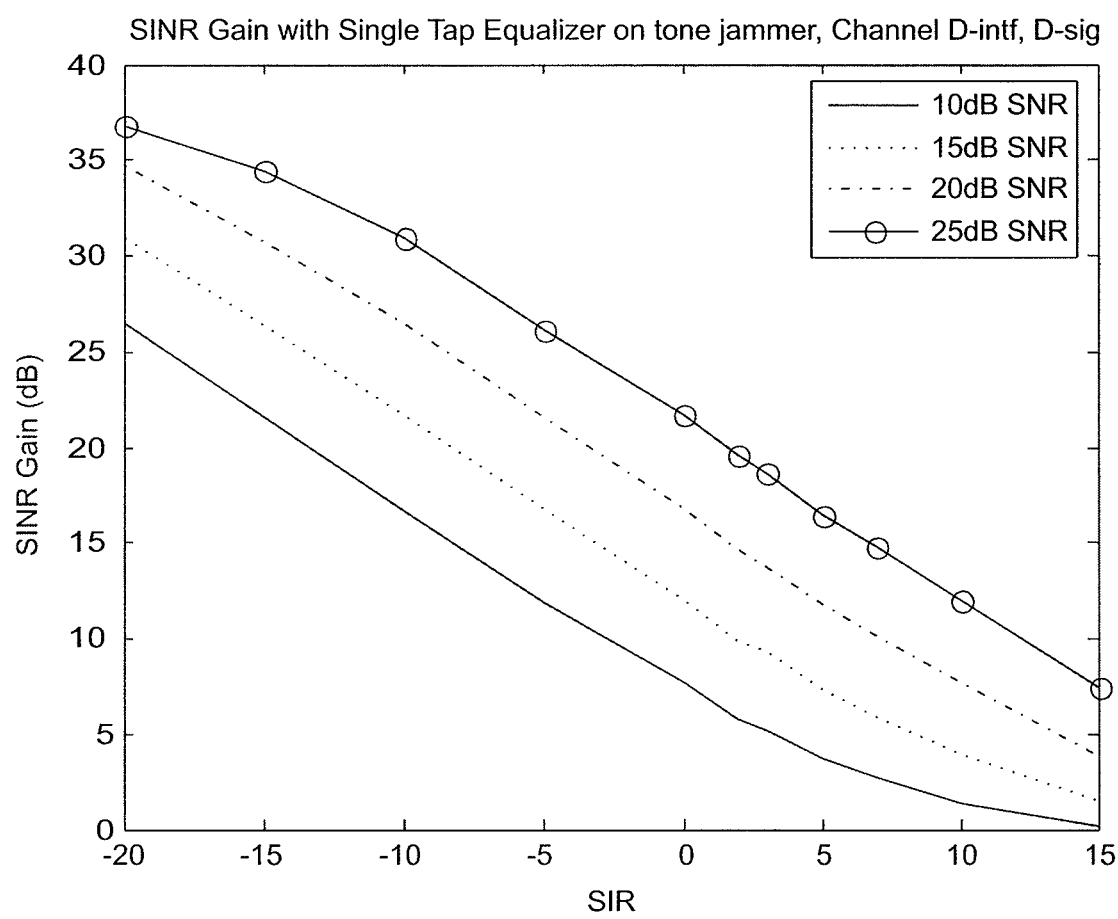
Figure 5D:
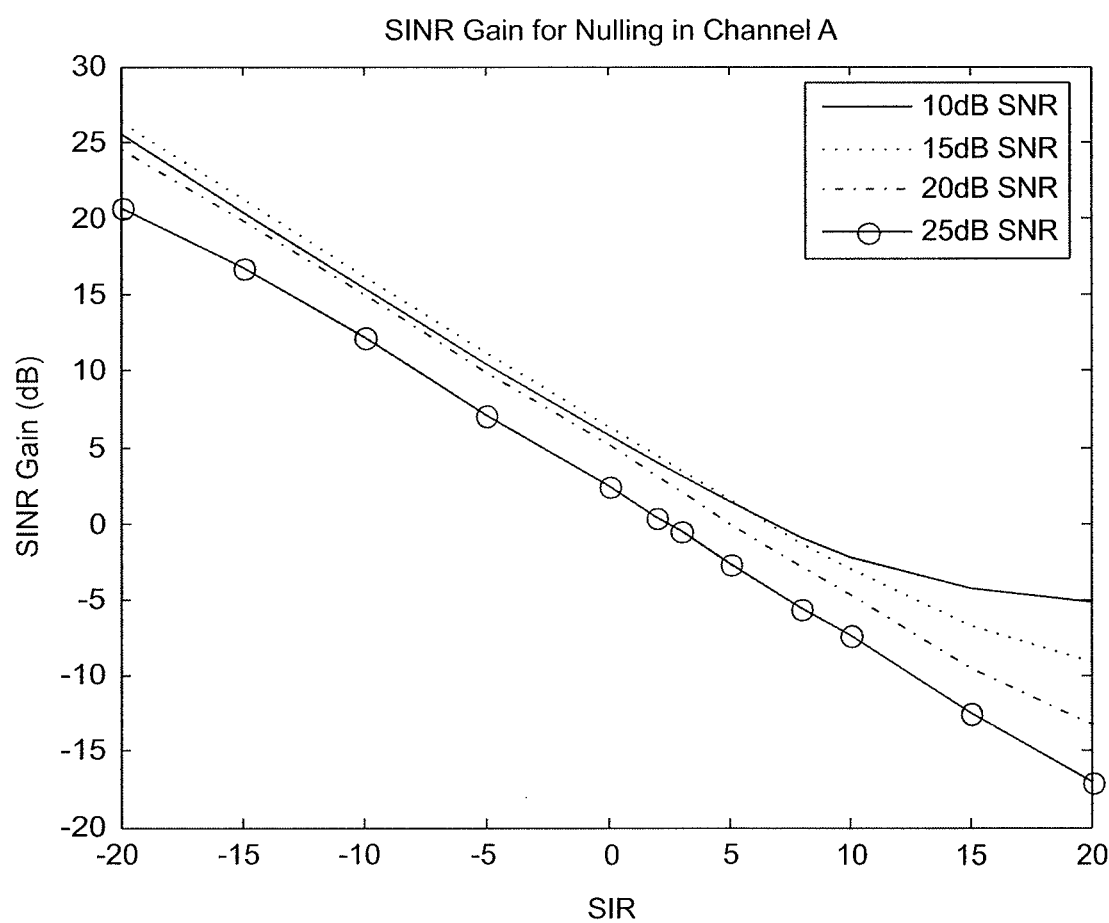
Figure 5E:
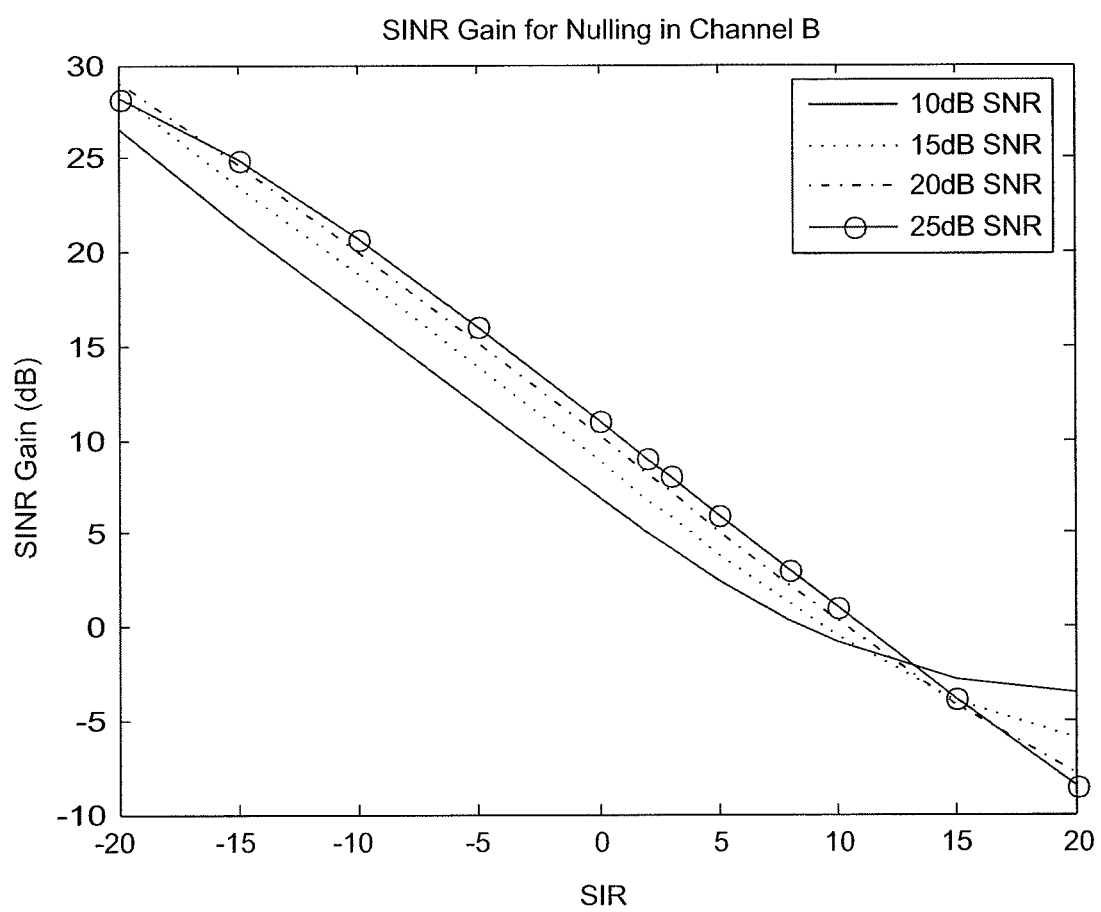
Figure 5F:
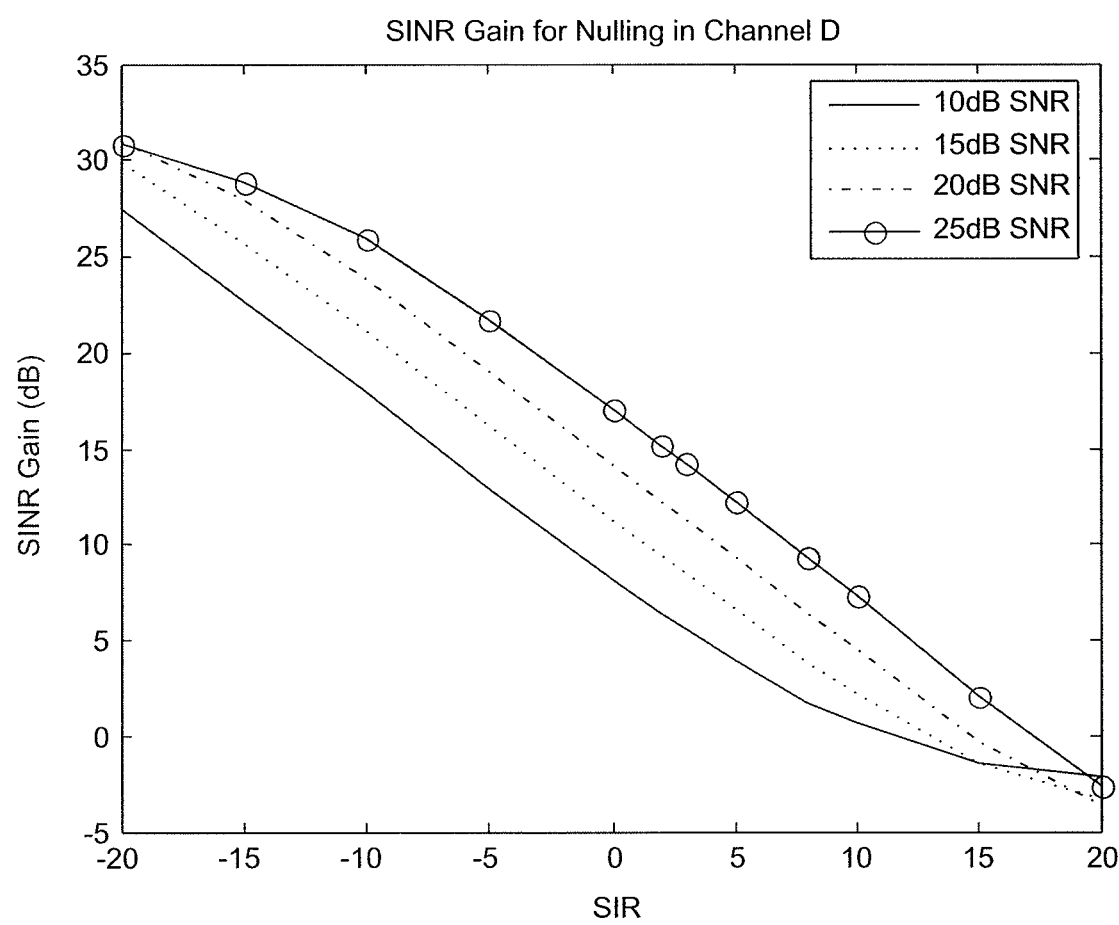
Figure 5G:
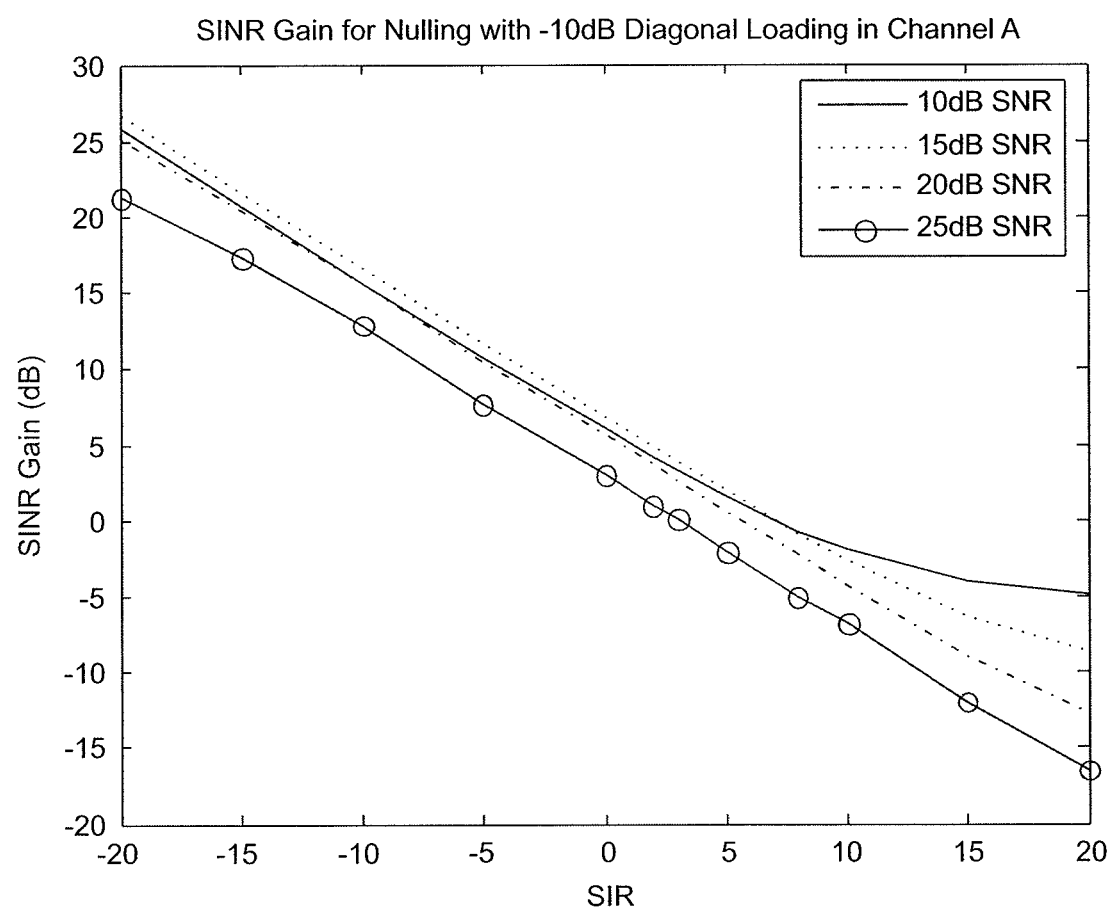
Figure 5H:
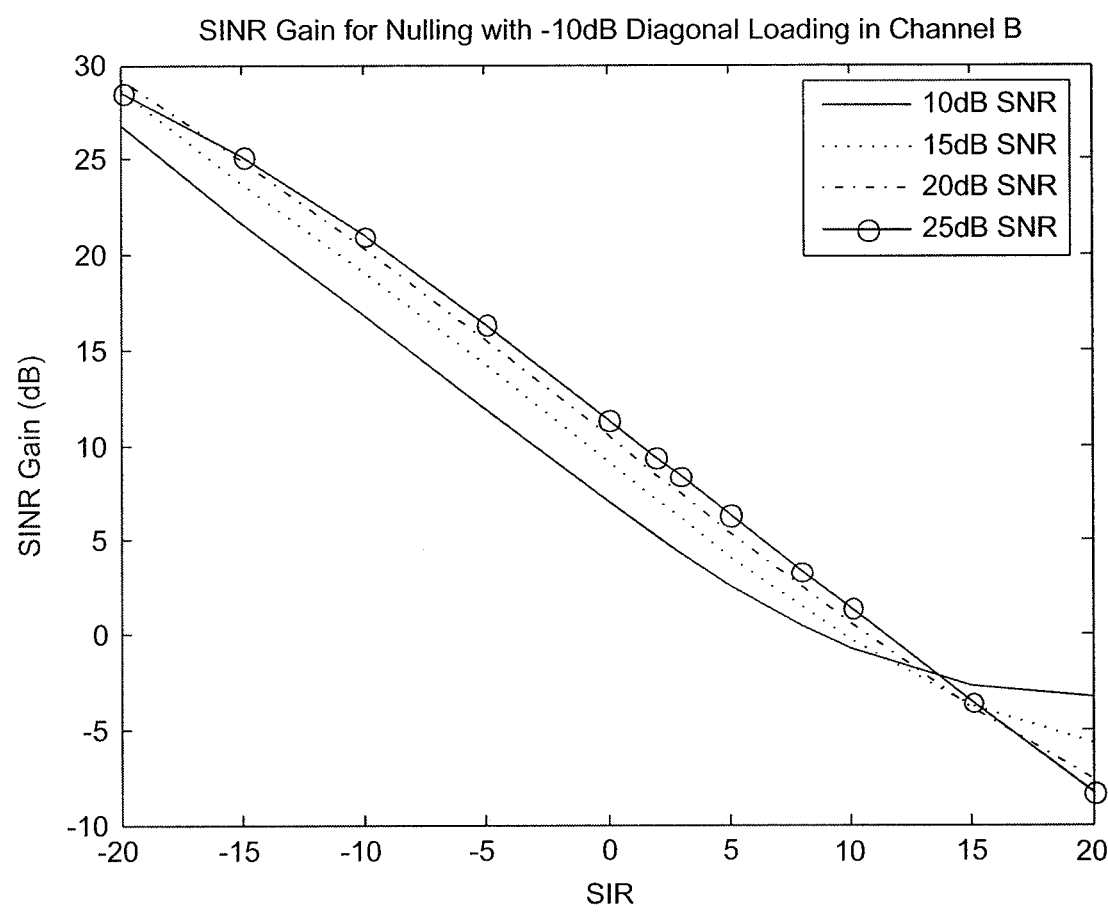
Figure 5I:
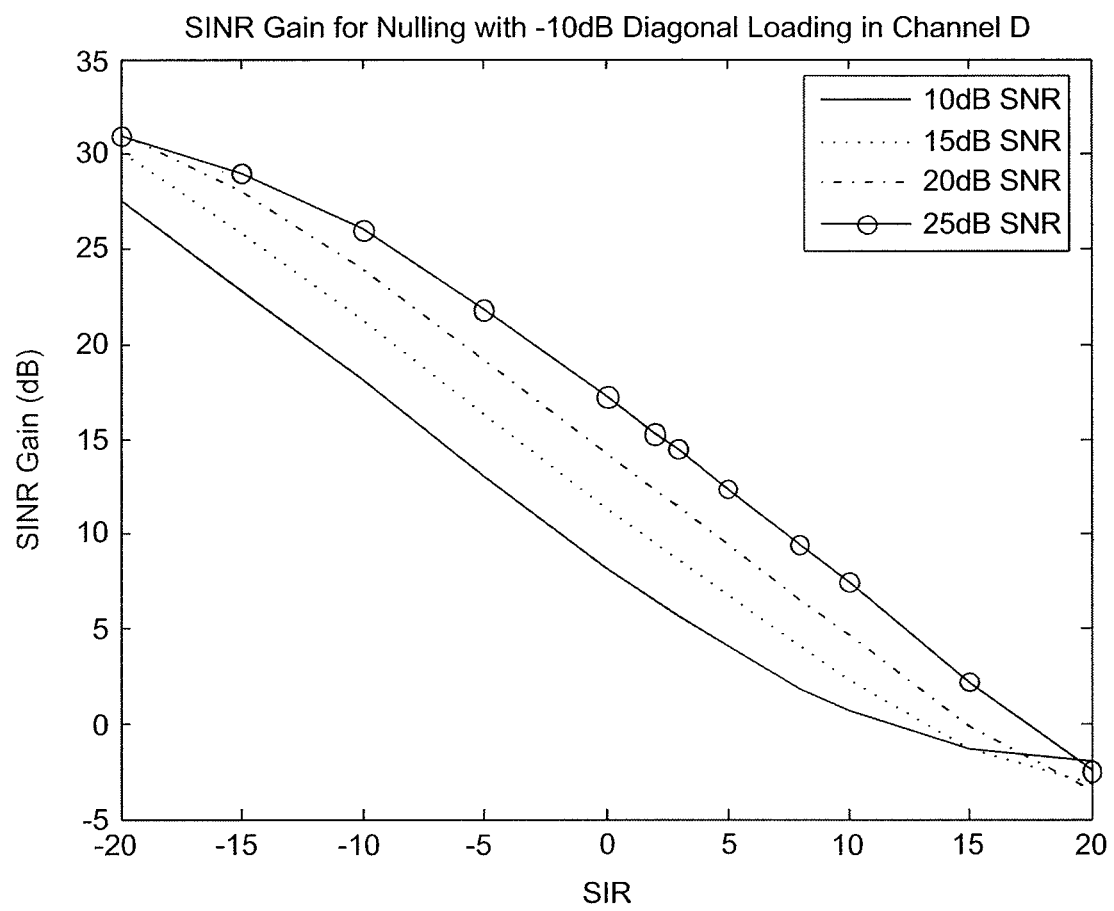
Figure 5J:
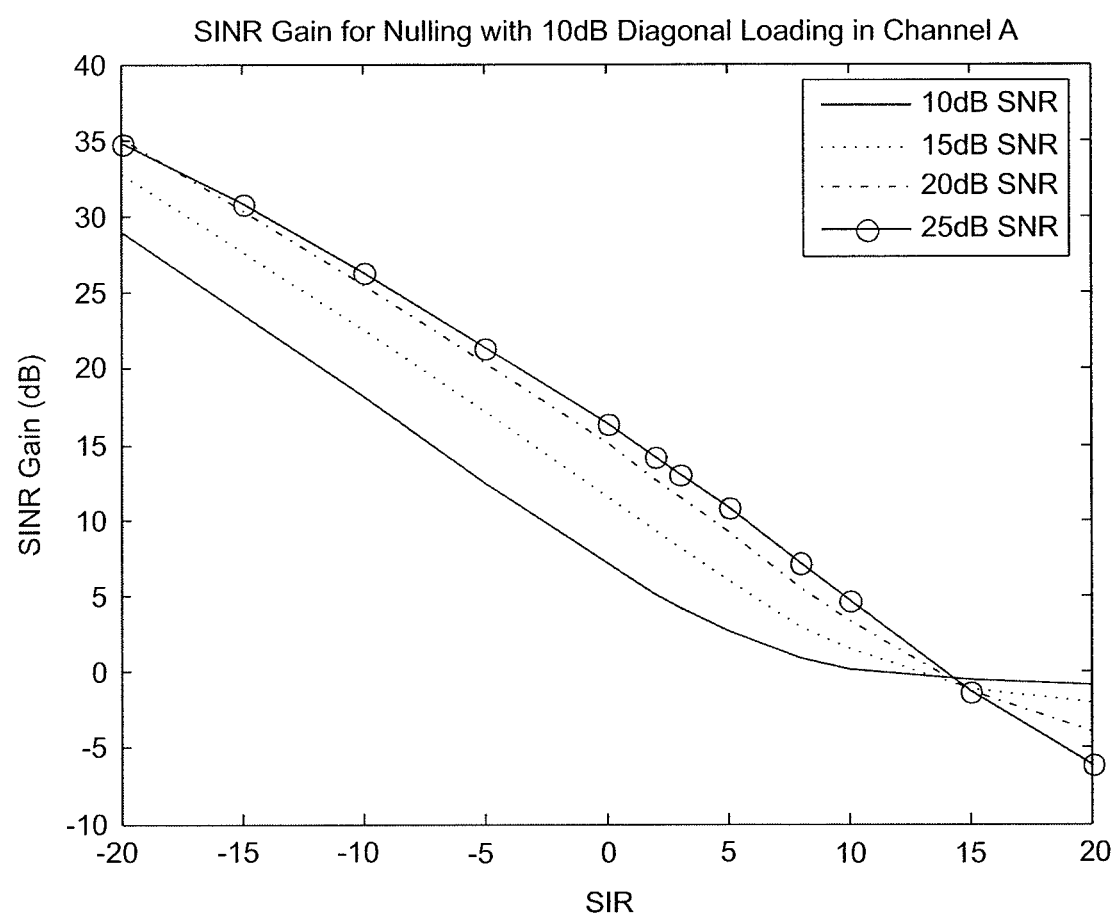
Figure 5K:
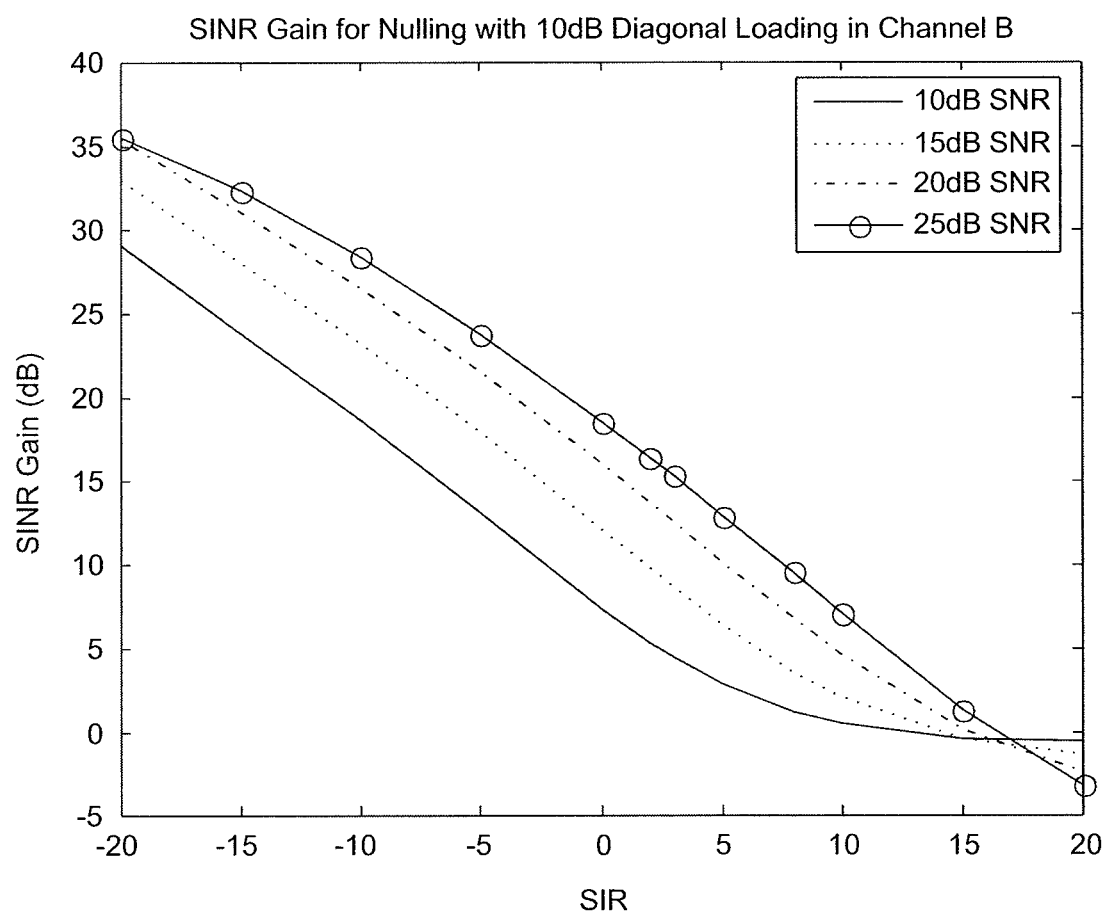
Figure 5L:
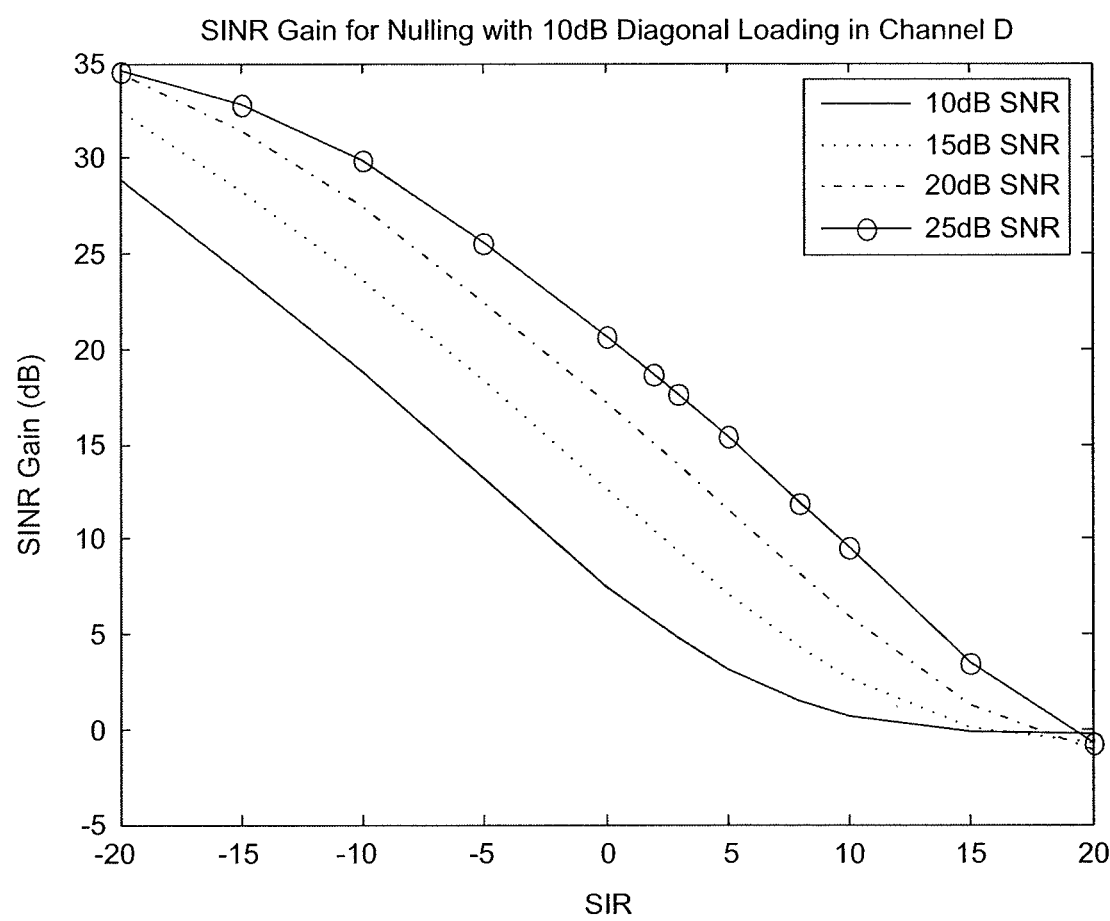

FIGS. 5A-5L are plots of the simulated signal-to-noise-plus-interference ratio (SINR) gain of the results. FIGS. 5A-5C show the results of the simulation using an eigenvector nulling interference mitigation method for channels A, B, and D. FIG. 5D-5F show the results of the simulation using a covariance matrix inversion interference mitigation method using no diagonal loading for channels A, B, and D. FIGS. 5G-5I show the results of the simulation using the covariance matrix inversion method with −10 dB of diagonal loading, and FIGS. 5J-5L show the results of the simulation using the matrix inversion method with +10 dB of diagonal loading.

The results show that the covariance matrix inversion method without some amount of diagonal loading may cause a decrease in the SINR when the interference power is low (see, e.g. FIGS. 5D-5L). As the amount of diagonal loading is increased, a floor develops at high SIR. This floor may represent the fact that the total SINR is dominated by the noise power as opposed to the interference power. In this scenario, the simulations show no appreciable gain in SINR.

Another factor in the performance of a communications system is synchronization. In order to properly decode an OFDM waveform, the receiver may benefit from synchronizing in time with the OFDM symbol boundary. Once the receiver is synchronized, it can further correct for carrier frequency change that could occur due to frequency offset between the transmitter and receiver local oscillators. Once it has corrected for these effects, the receiver can also estimate the channel. The presence of an interfering signal can have detrimental effect on all of these parameter estimations. In order to test the performance of some of the mitigation techniques, a simulation was performed with the lowest rate modulation, binary phase shift keying (BPSK), with a rate ½ code transmitted on a single spatial stream. The simulation determined if the packet was detected and the header data correctly decoded.

Figure 6A:
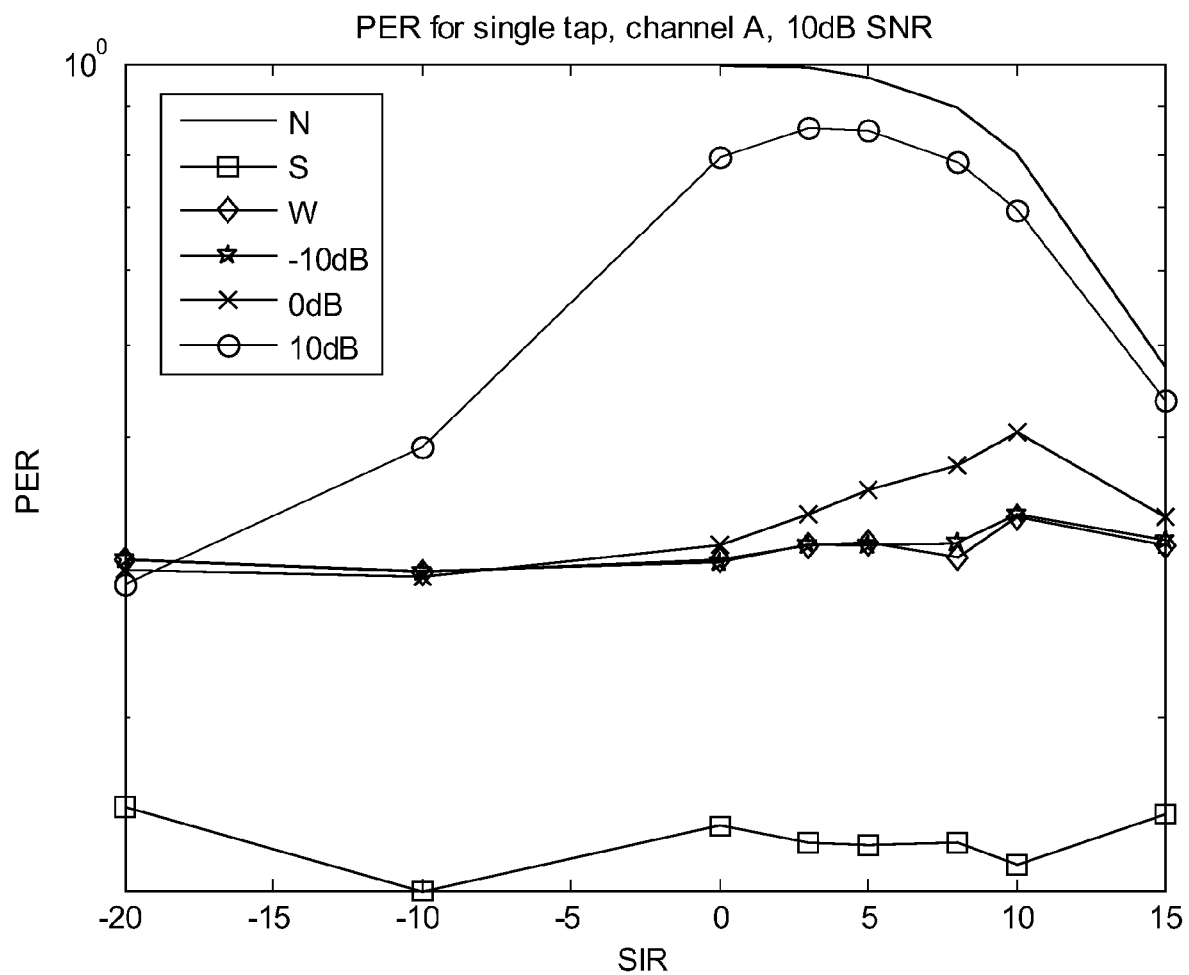
FIGS. 6A-6F are plots of the simulated packet detection performance of various channels using a number of interference mitigation methods.
Figure 6B:
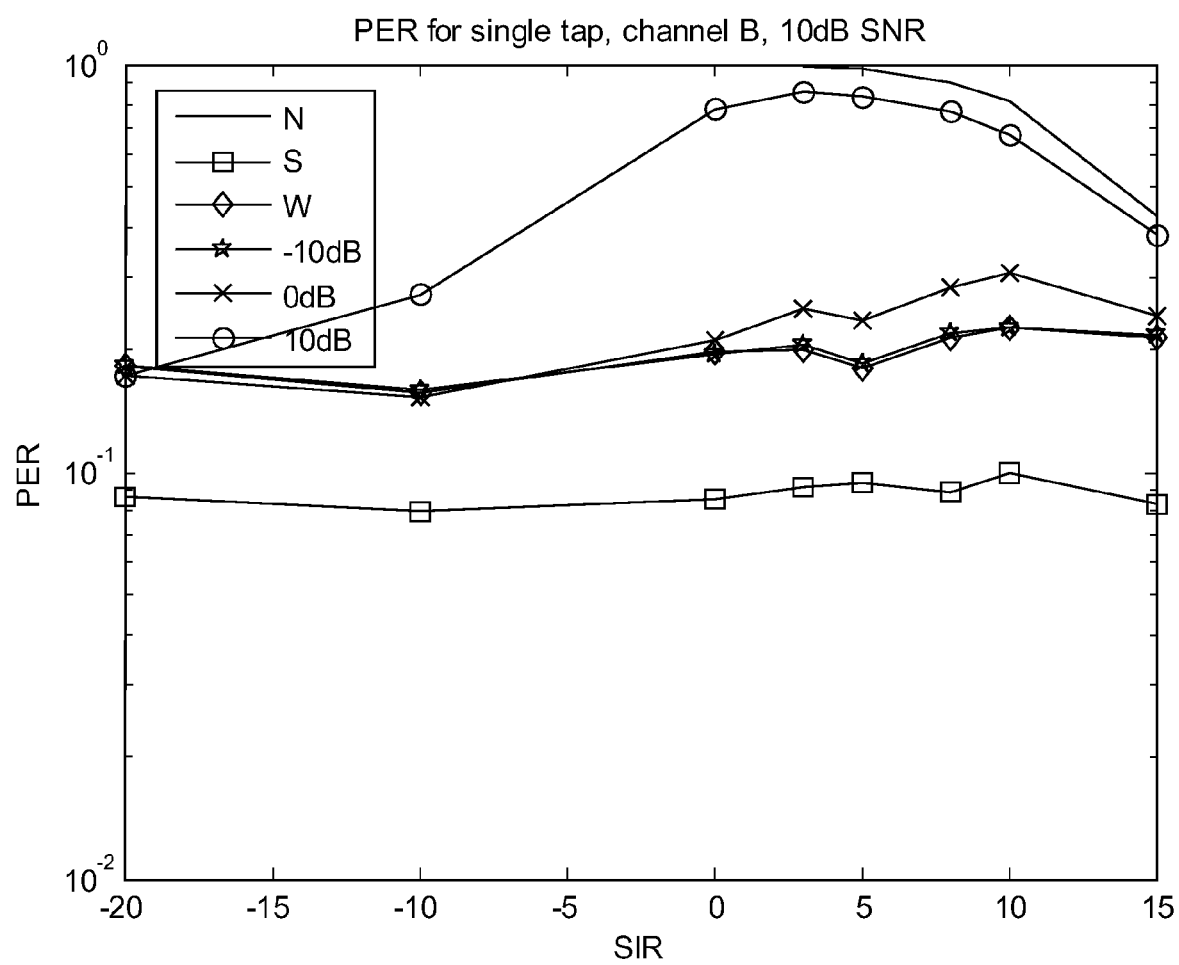
Figure 6C:
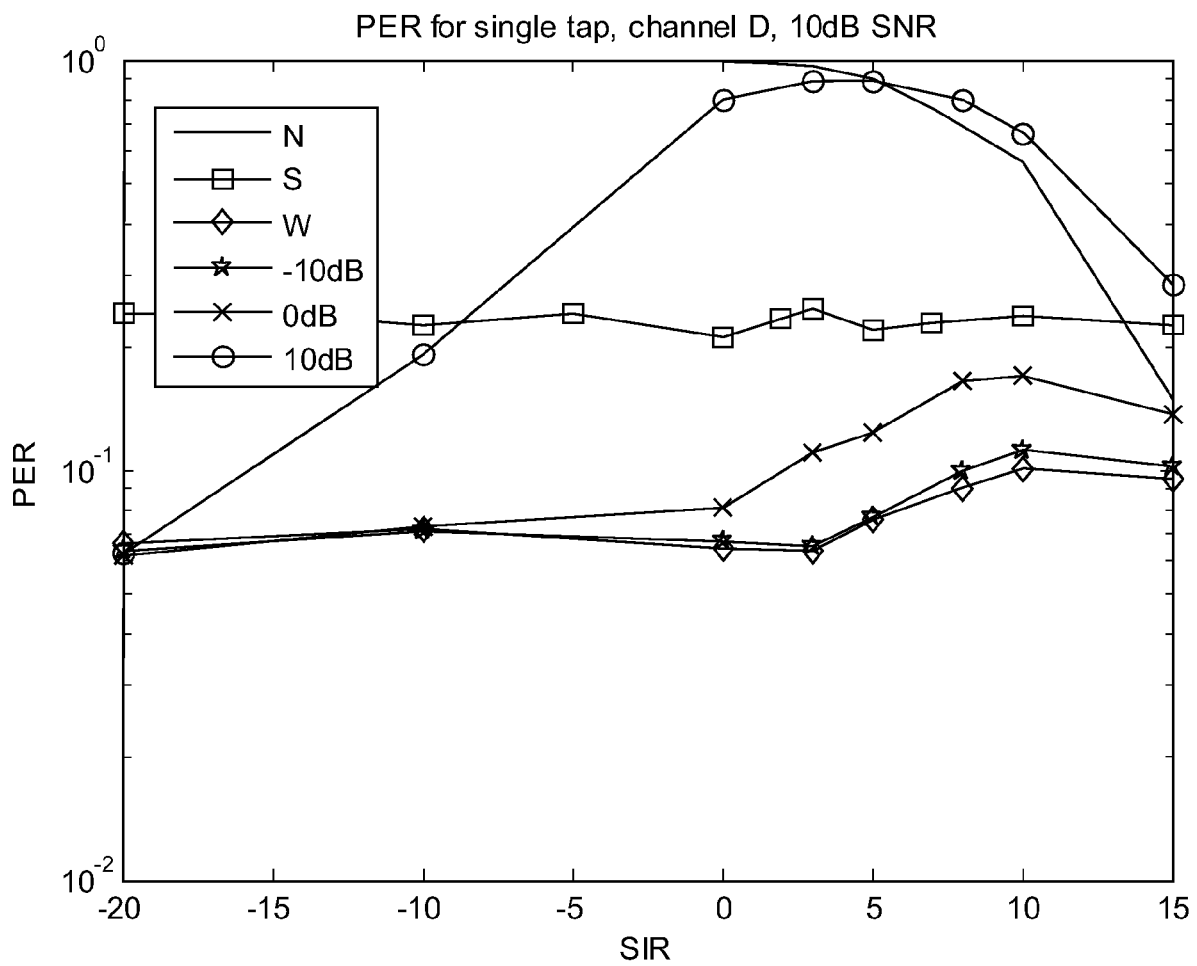
Figure 6D:
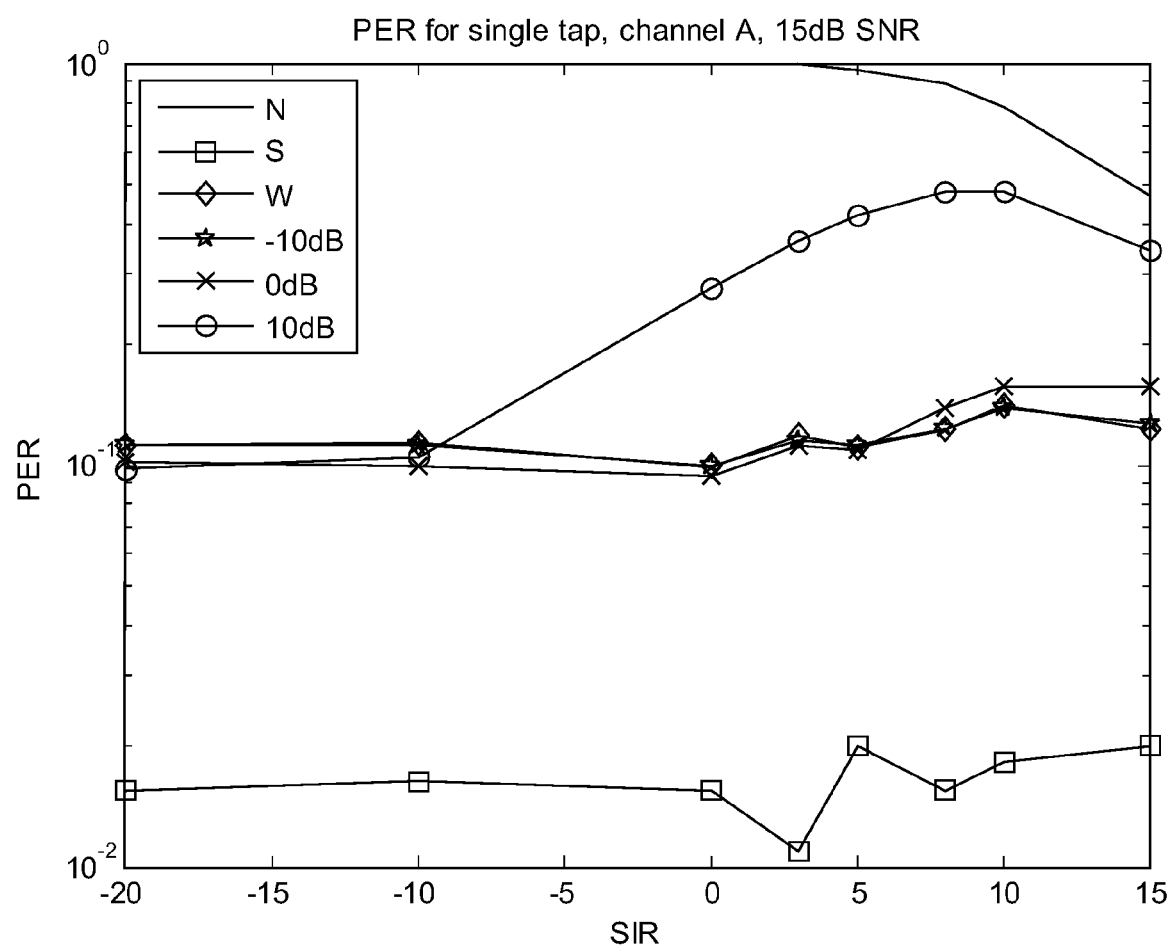
Figure 6E:
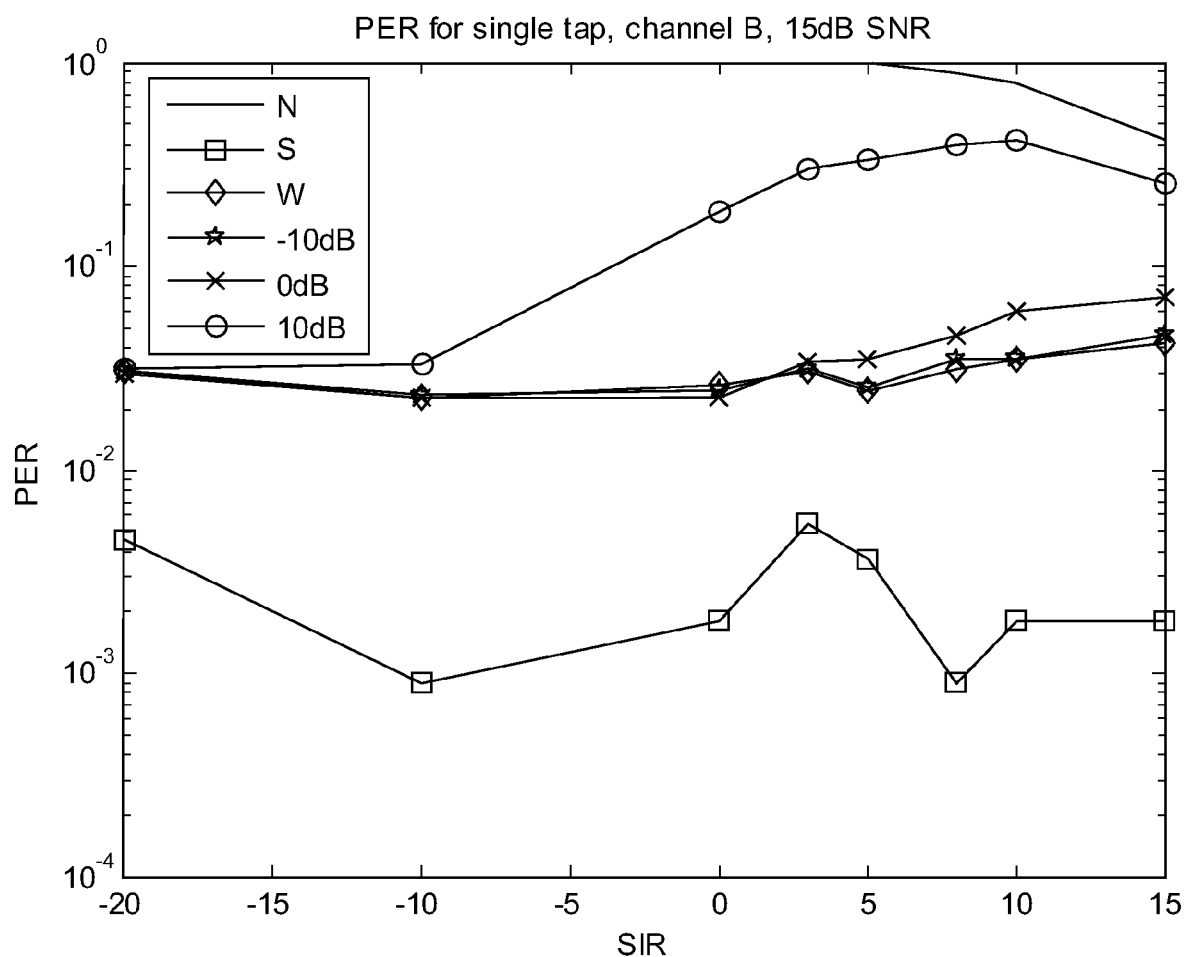
Figure 6F:
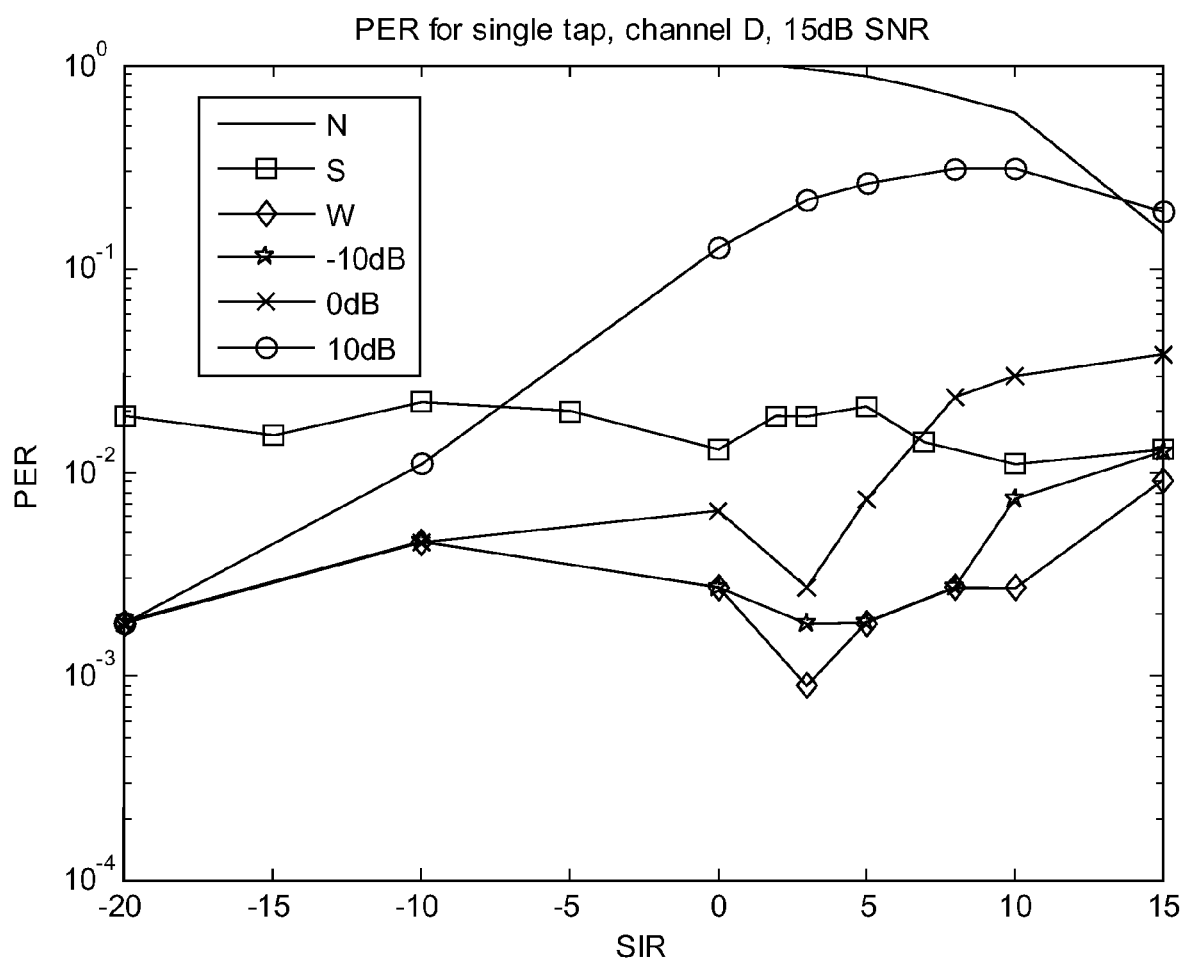

FIGS. 6A-6F are plots showing the packet detection performance of the various methods in channels A, B, and D. FIGS. 6A-6C show the results for channels A, B and D in 10 dB SNR, whereas FIGS. 6D-6F show the results for the same channels in 15 dB SNR. The following table is a legend for the curves of FIGS. 6A-6F.

TABLE 1

Legend for Packet Error Rate Curves

| | |
|---|---|
| N | No interference mitigation |
| S | Eigenvector nulling |
| W | Covariance matrix inversion without diagonal loading |
| −10 dB | Covariance matrix inversion with −10 dB diagonal loading |
| 0 dB | Covariance matrix inversion with 0 dB diagonal loading |
| 10 dB | Covariance matrix inversion with 10 dB diagonal loading |

The performance of the covariance matrix inversion based methods was similar in all channels, but the eigenvector nulling clearly showed a better preference in non-dispersive channels. The simulation show that the eigenvector nulling method outperformed the other methods when the delay spread in the channel was relatively small.

Figure 7A:
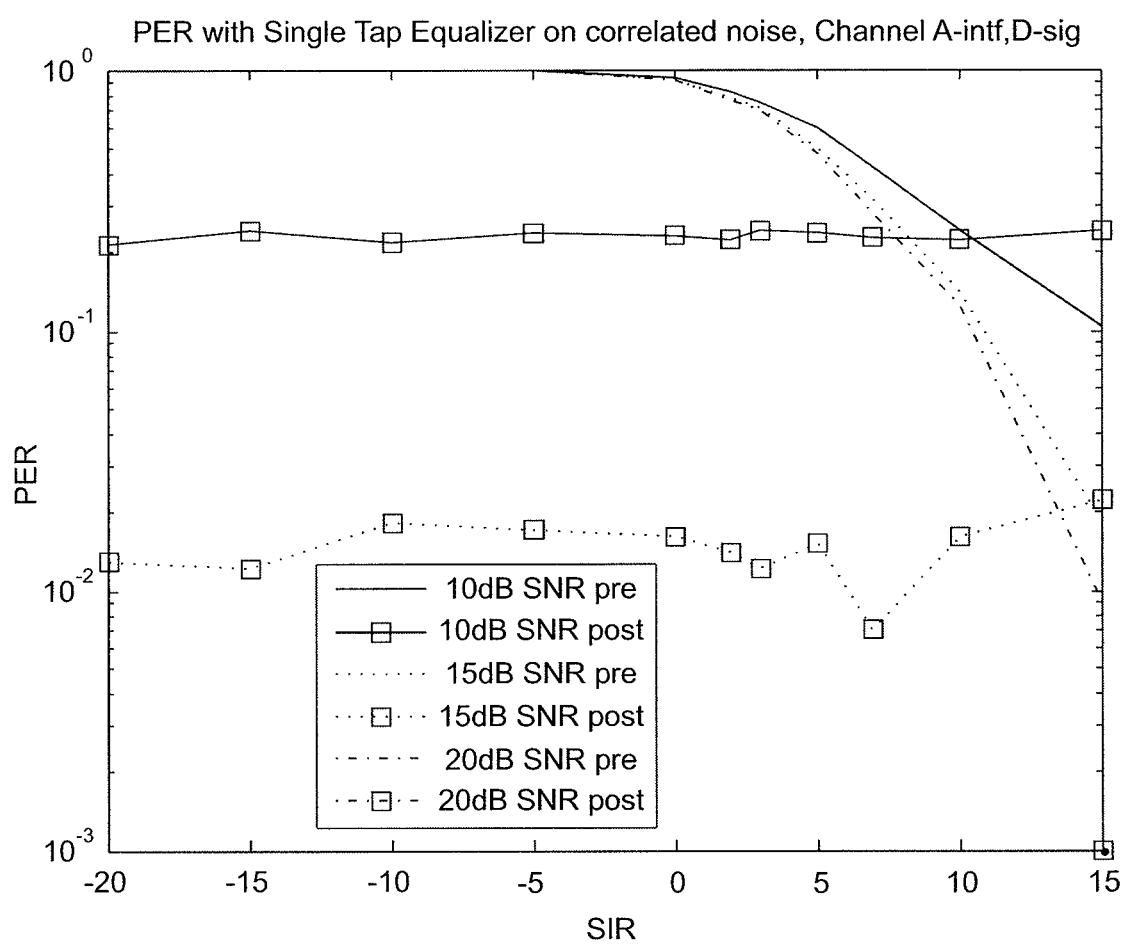
FIGS. 7A-7C are plots of the simulated packet detection performance of various channels in wideband noise using an eigen nulling interference mitigation method.
Figure 7B:
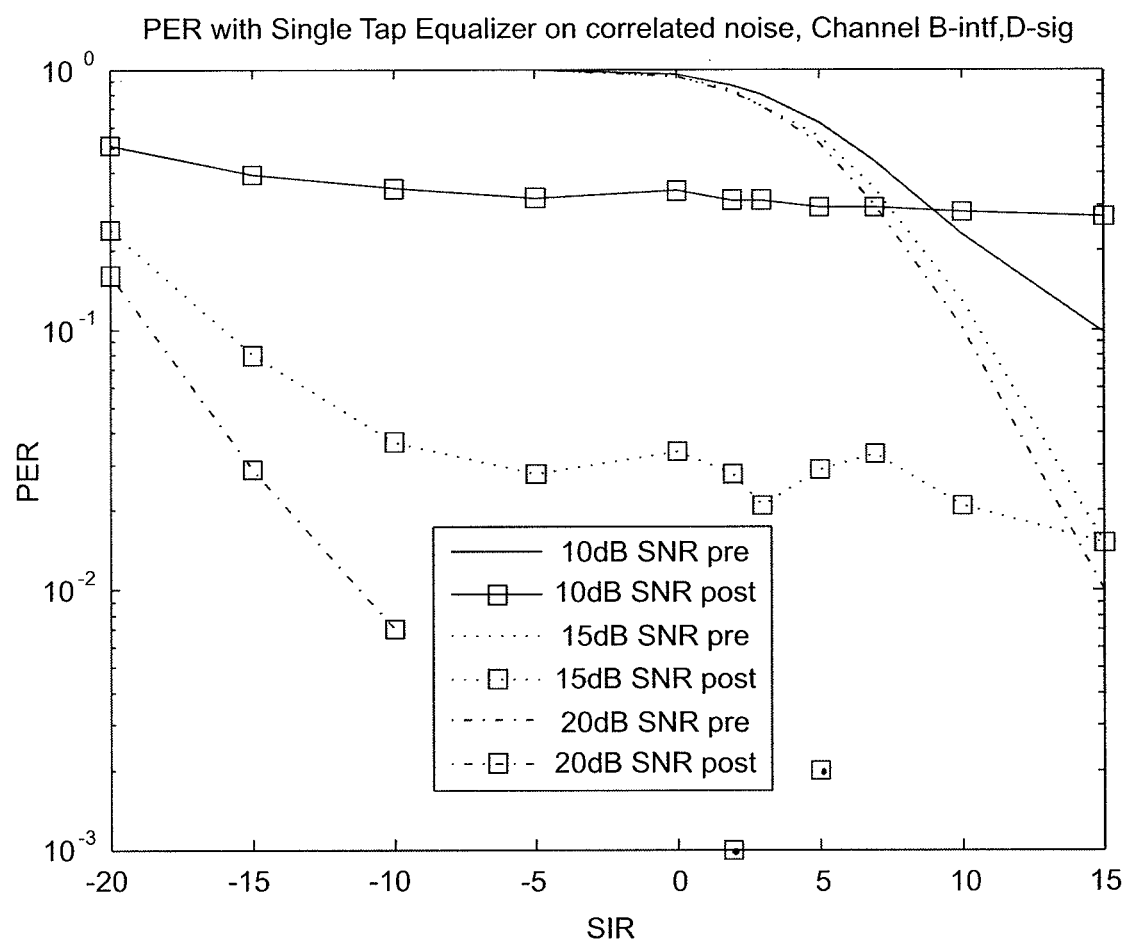
Figure 7C:
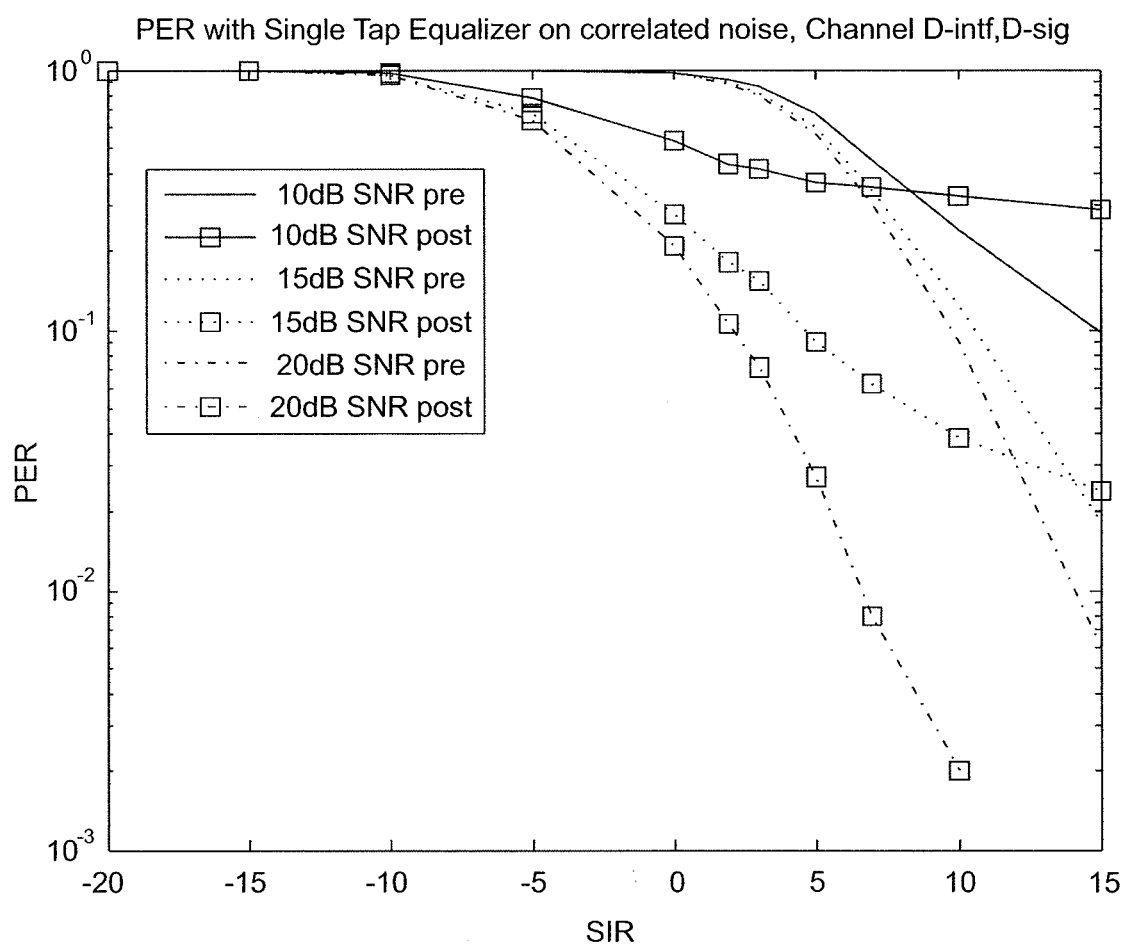

Similar multi-antenna interference mitigation methods were tested in the presence of a wideband interference source. In this case, the simulation again shows that the channel may have a significant impact on the performance of the mitigation algorithm. FIGS. 7A-7C show the results of the simulation for channels A, B, and D. The performance of the single tap system in channel A, which is a single-tap Rayleigh flat fading channel, is reasonably good, however, once the channel becomes more dispersive, the simulations show that a single spatial tap may not be enough to cancel the interference. The simulations show that in a non-dispersive channel, the single spatial tap performs relatively well even at very low SIR, however, once the channel becomes more dispersive (see, e.g., FIGS. 7B and 7C) the performance quickly degrades at lower SIR. The previously mentioned heuristic scheme for disabling the interference mitigation helps to solve this issue. Again, the simulations show the harshness of covariance matrix inversion may be detrimental when the performance of the system is limited by noise power as opposed to interference power.

Figure 8A:
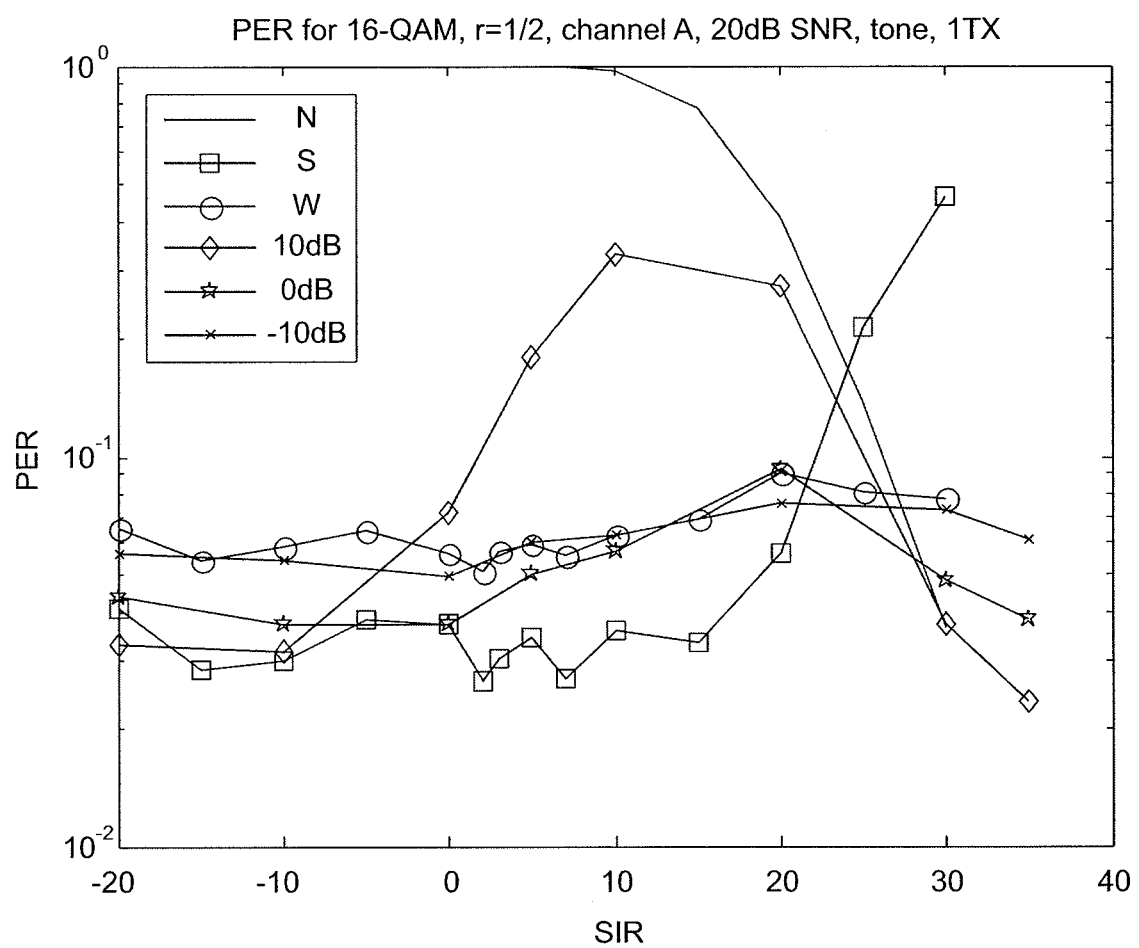
FIGS. 8A-8I are plots of the simulated packet detection performance on various channels with various numbers of transmitter antennas.
Figure 8B:
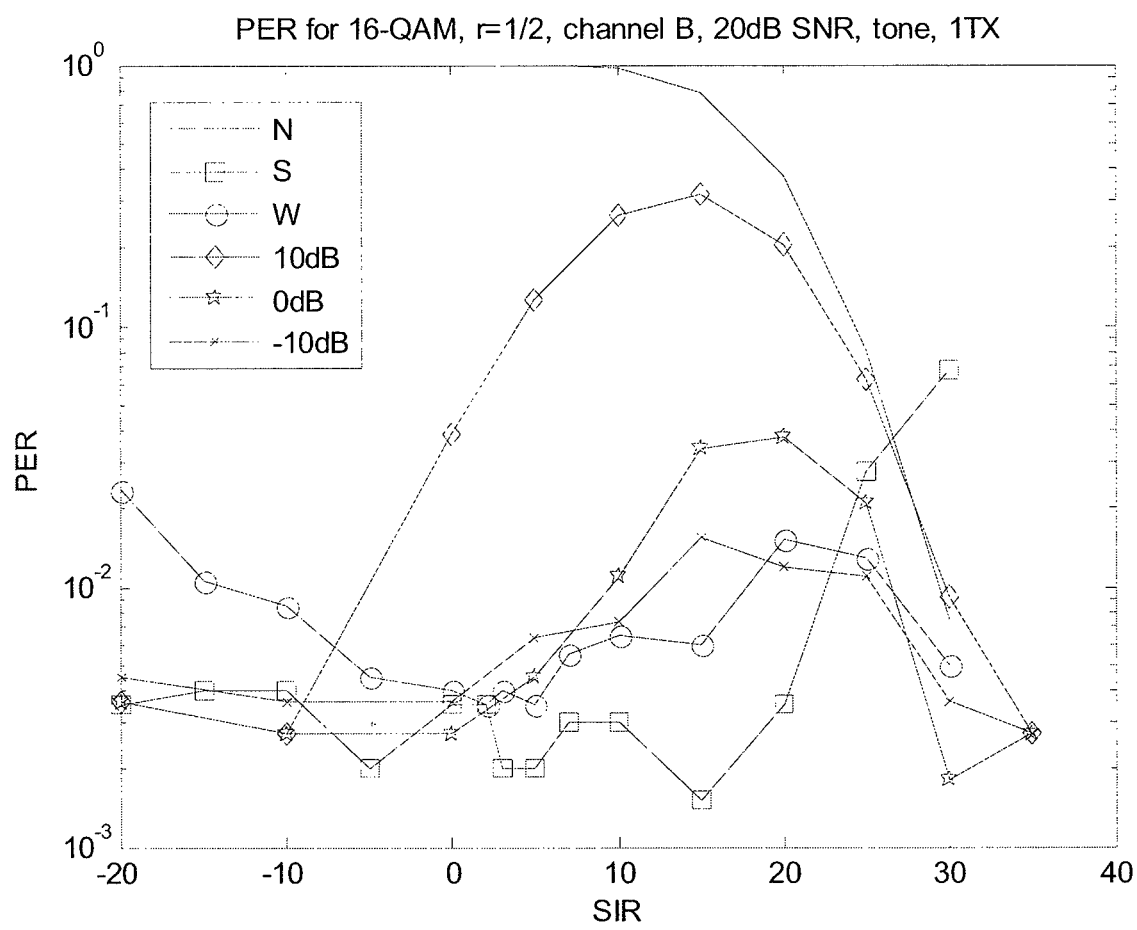
Figure 8C:
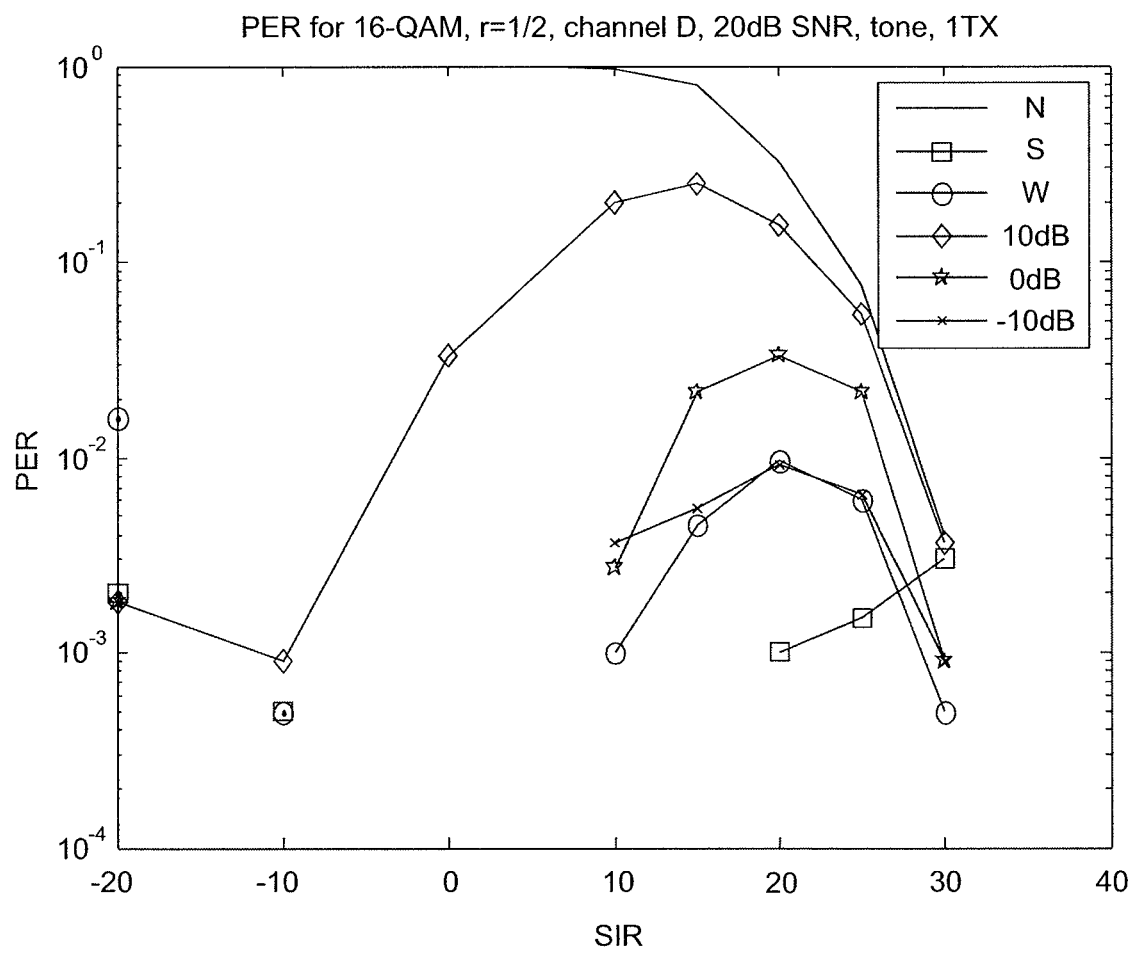
Figure 8D:
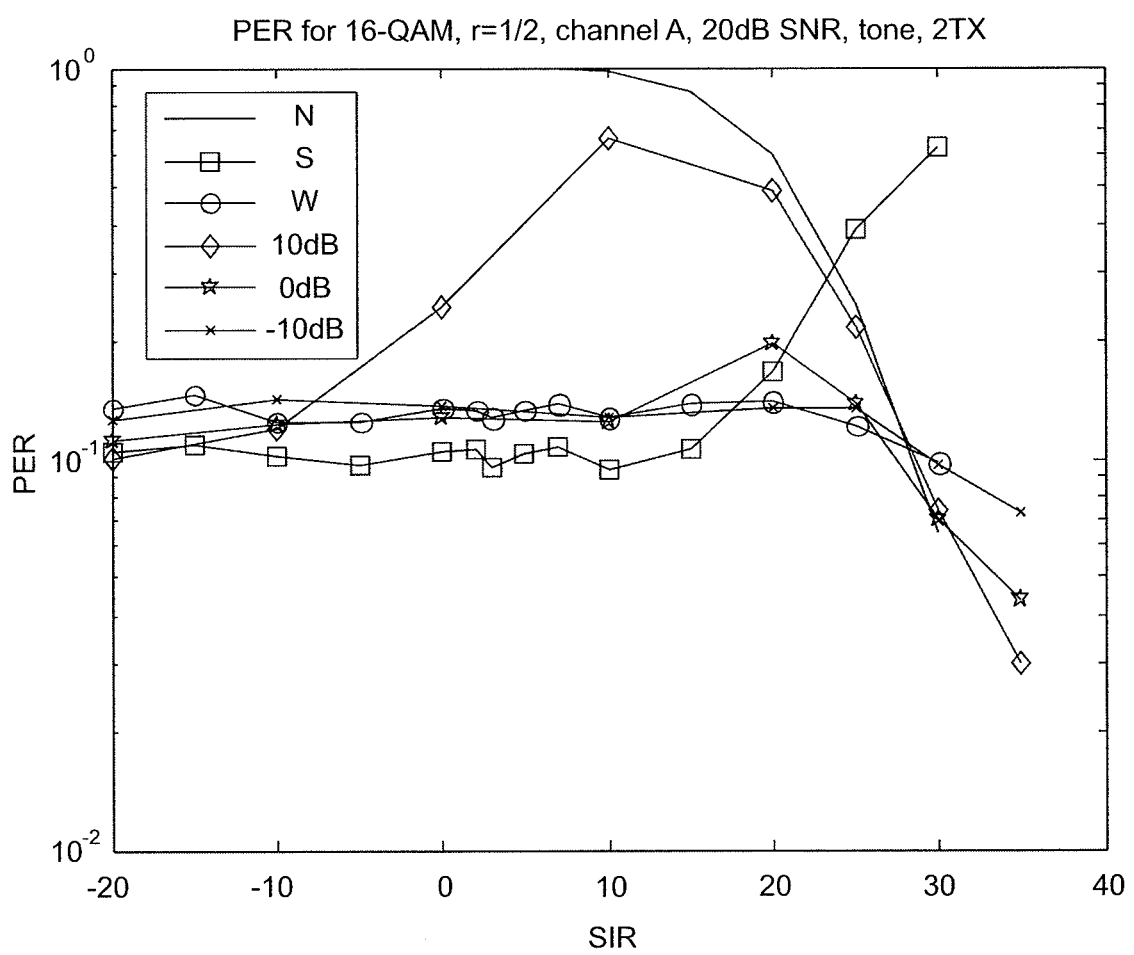
Figure 8E:
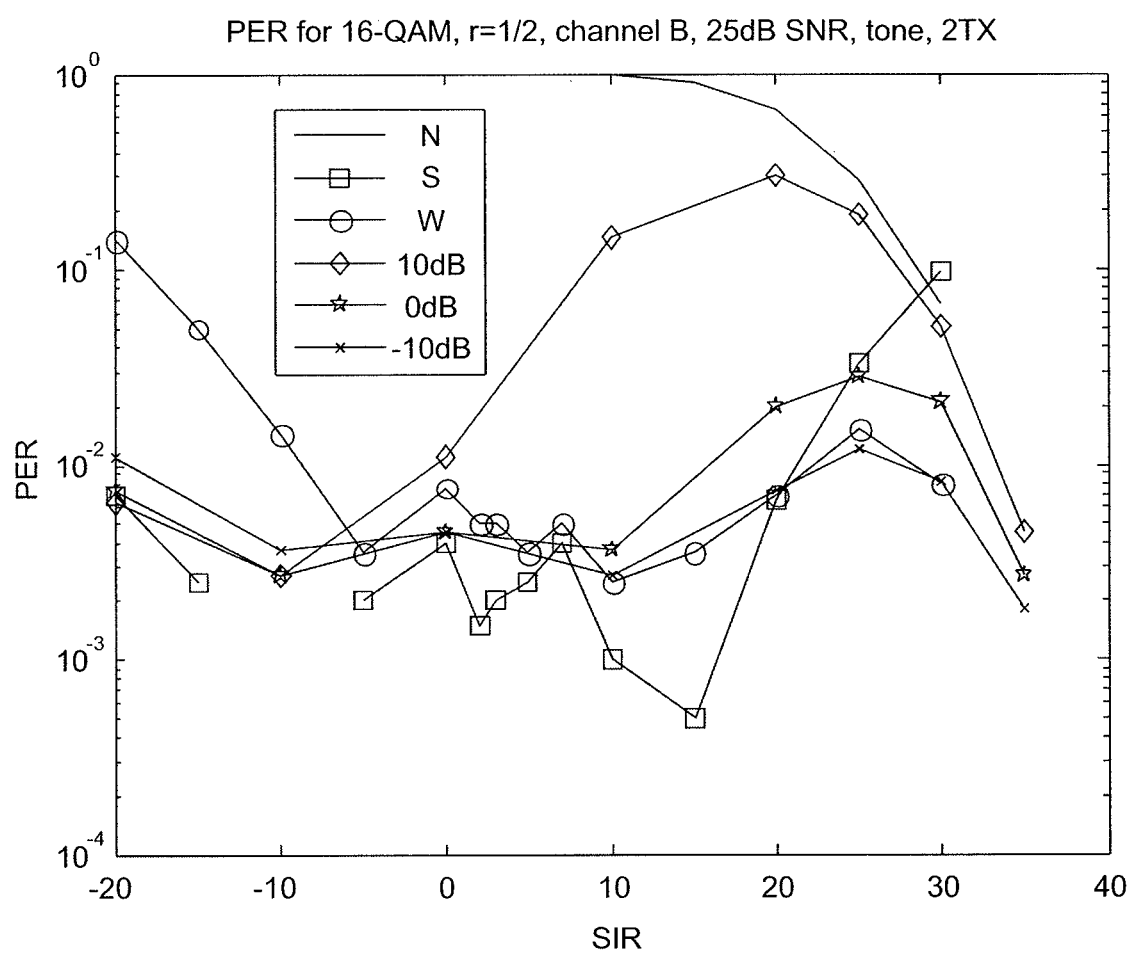
Figure 8F:
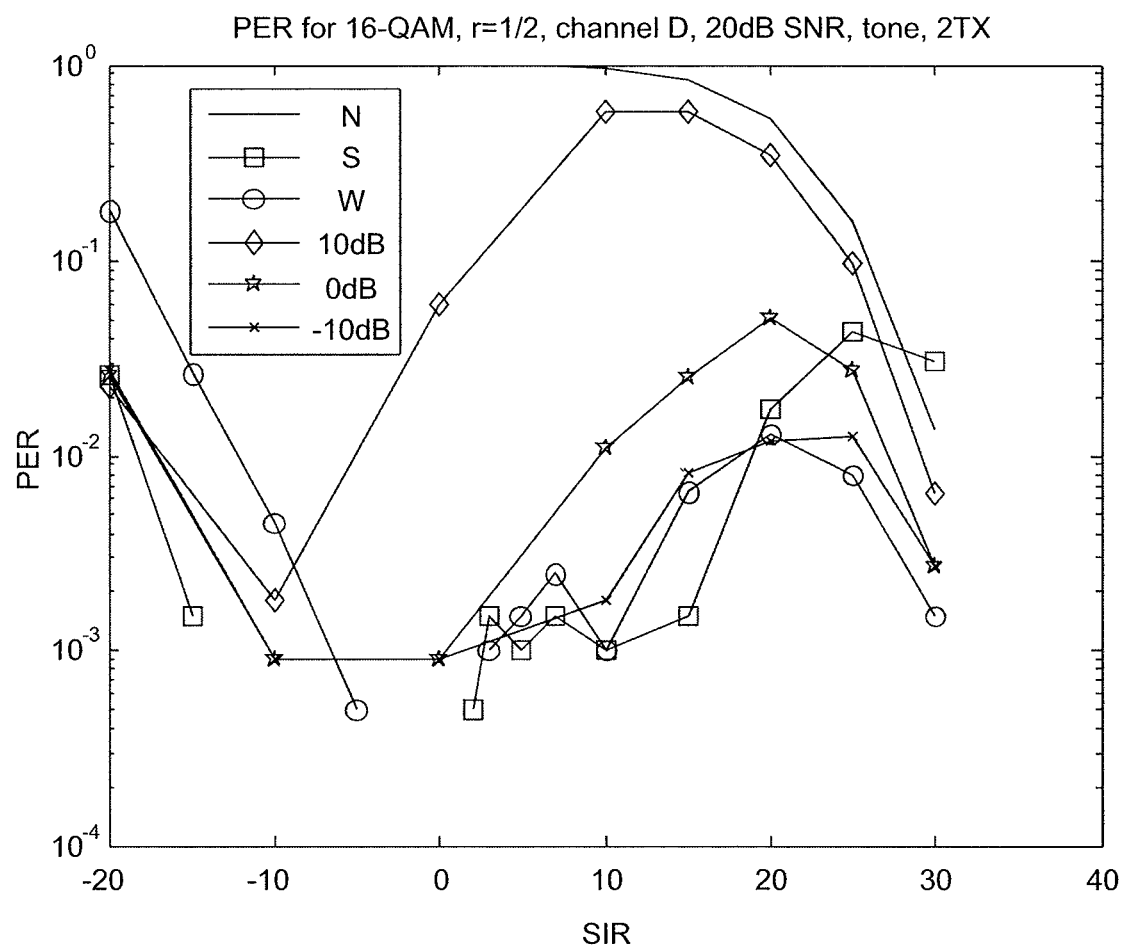
Figure 8G:
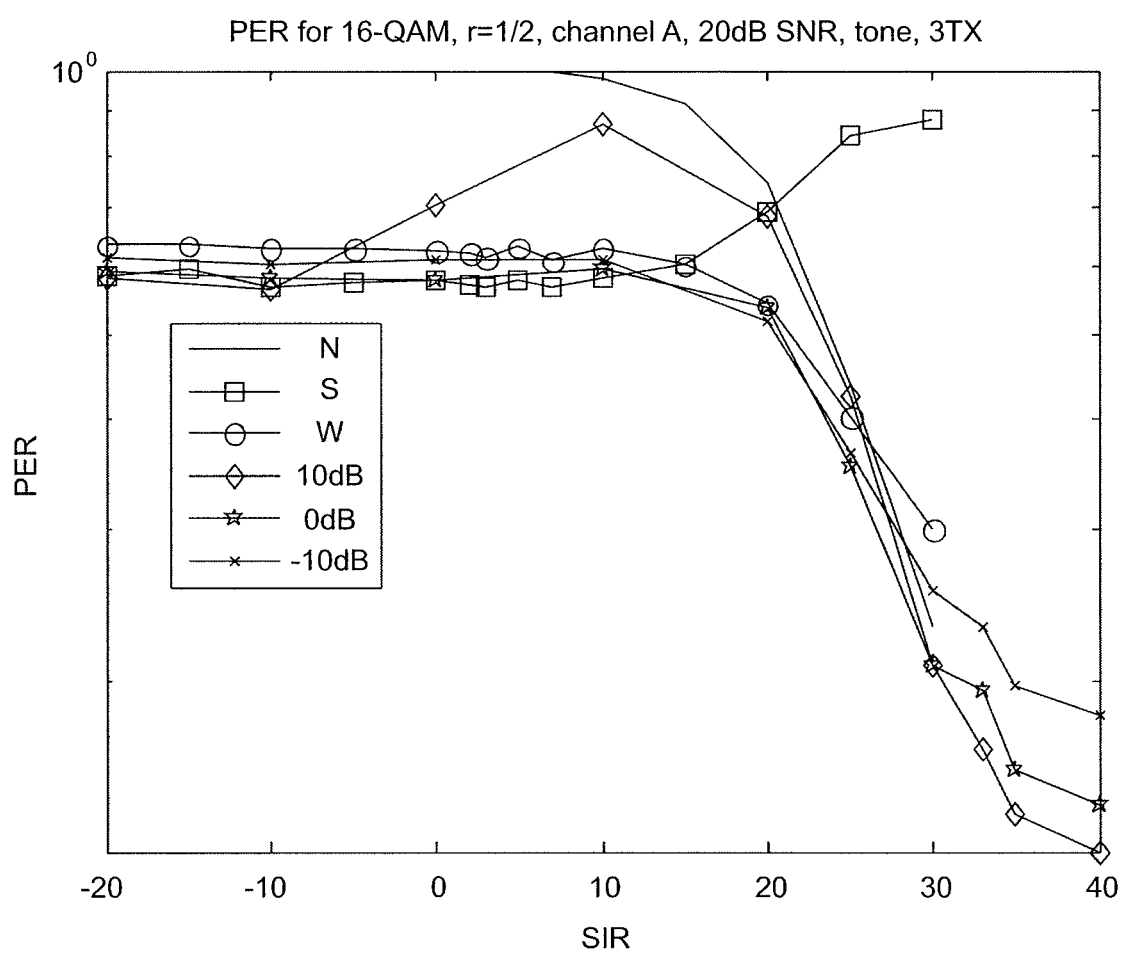
Figure 8H:
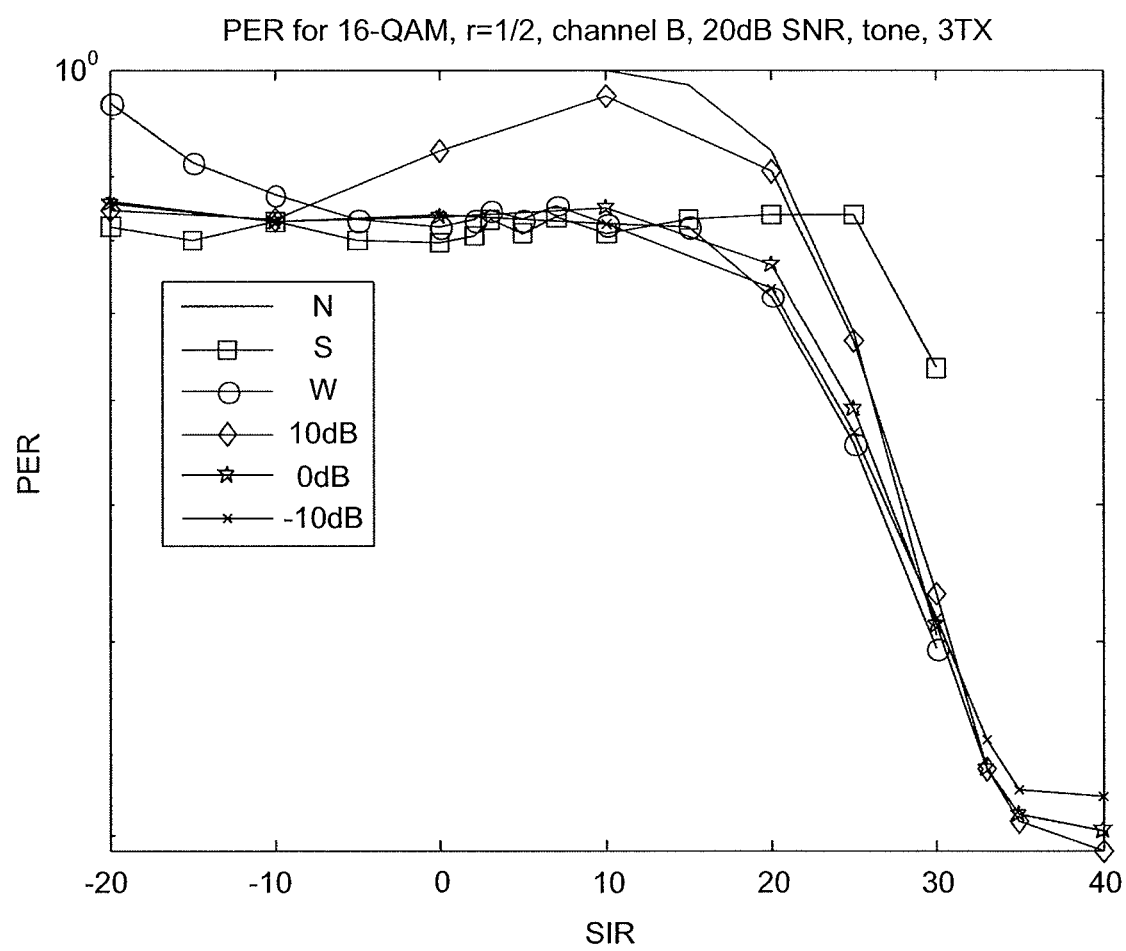
Figure 8I:
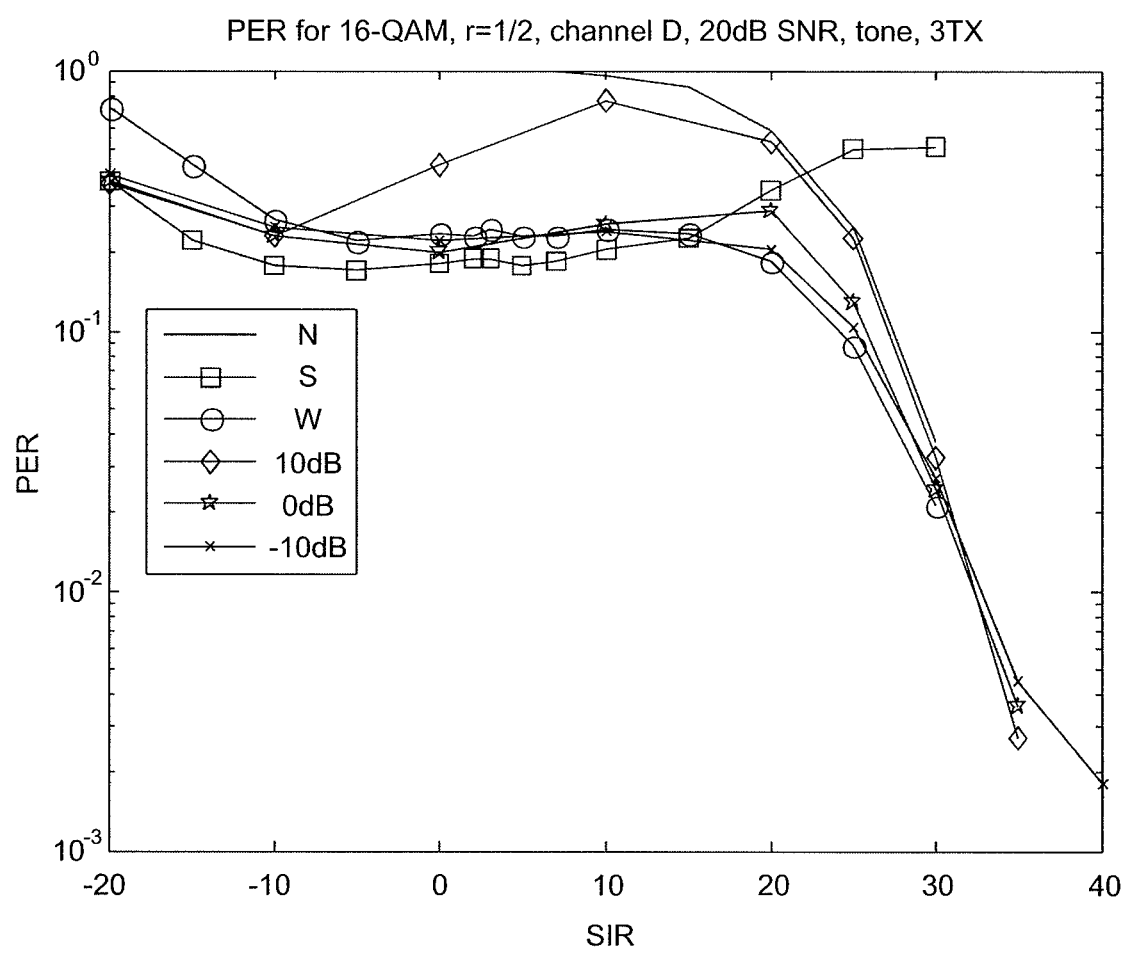

Simulations were also performed to determine the packet error rate (PER). FIGS. 8A-8I are plots showing the results of a packet error rate simulation for various channels for a various number of transmitter antennas at 20 dB SNR. FIGS. 8A-8C show the results of the PER simulation for channels A, B, and D using 1 transmitter antenna. FIGS. 8D-8F show the results of the PER simulation for the same channels using 2 transmitter antennas. FIG. 8G-8I show the results of the PER simulation for the same channels using 3 transmitter antennas.

The simulations show that the frequency diversity present in the multipath channel has a beneficial effect on the performance. They also show that the eigenvector nulling method has a poor performance in the high SIR region of all plots. This may be due to the lack of intelligence in the receiver to disable the interference mitigation when the interference power has dropped well below the noise floor. The methods examined have similar performance in the low SIR (−20 dB) region. The performance varies for each algorithm as the SIR is increased from −20 dB to +40 dB. The simulations show that the covariance matrix inversion method has almost no benefit when the interference power is equal to or less than the noise power. As discussed previously, one drawback of covariance matrix inversion without diagonal loading is that it can potentially amplify the noise power. If the noise power is amplified more than the interfering signal is suppressed, there should be no distinguishable improvement in performance. The diagonal loading improves performance in this region by biasing the noise-and-interference covariance matrix. The simulations show that as the diagonal loading is increased, the performance in the 0 dB to 20 dB region is similarly increased. These gains are achievable with little or no loss in the low SIR region from −20 dB to 0 dB. The simulations also show that when the interference power is sufficiently below the noise floor, the performance of the diagonally loaded covariance matrix inversion tracks the performance of the non-filtered signal, whereas the other methods actually have performed worse in this region.

Channel D provides the best performance, possibly due to the nature of OFDM modulation, rather than the nature of the interference. Channel D has a 50 ns rms delay spread, which creates a frequency-selective channel. This frequency diversity is exploited by the coding and interleaving that is performed over the data subcarriers. Channel A is a single tap Rayleigh flat fading channel. Since the simulated OFDM modulation scheme cannot exploit frequency diversity in this channel, there are more drastic results when the packet is transmitted through a bad channel. Channel B has 15 ns rms delay spread, so it is not as selective as channel D, but it does provide some amount of frequency diversity. The increase in performance is apparent from the y-axis of FIGS. 8A-8C.

The same simulations were run with 2 and 3 transmit antennas. The PER curves generally have the same basic shape, with the main difference being the overall performance (see, e.g., FIGS. 8D-8I).

Some of the disclosed multi-antenna mitigation schemes can be implemented on hardware. For example, the hardware can be combined with a MIMO OFDM cognitive radio testbed, such as, for example, a cognitive radio testbed developed and available from Silvus Technologies, Inc. of Los Angeles, Calif. In some embodiments, the transmitter and receiver on a testbed are contained in a field-programmable gate array (FPGA), in a programmable logic device, or in another suitable type of circuit. An interference mitigation module can be added functionally before the existing receiver to filter the received signal and mitigate interference before the existing receiver attempts to decode the packet.

The interference mitigation module, similar to the embodiment shown in FIG. 3, comprised four major logical components. The first of the four components was a covariance estimation block for estimating a covariance matrix based on a received waveform. This was performed as an averaging of the outer product of the received waveform.

The second component was responsible for calculation of the spatial filtering matrix. For practical reasons, this operation was done on a microprocessor that was attached to the FPGA which contains the real-time MIMO OFDM transceiver. As this was being done on a microprocessor, it was done in full-floating point arithmetic using matrix inversion and SVD decomposition algorithms, all of which can be written in a computer programming language, such as, for example C/C++. The third component performed the matrix-vector multiplication required to apply the spatial filter. The final component was a controller which executed a finite state machine similar to that shown in FIG. 4.

A protocol was developed for passing matrices between the host and FPGA to prevent data corruption. The typical interval between passing the covariance matrix to the host and receiving a spatial filtering matrix back was roughly 1 millisecond. The matrices were double-buffered within the FPGA to ensure the interference mitigation subsystem did not attempt to read a matrix before all of the data had been successfully received from the microprocessor. A similar protocol was used to ensure data integrity on the covariance matrices sent to the microprocessor.

CONCLUSION

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of estimating a covariance matrix in a communication system, the method comprising:
   i) obtaining a plurality of waveforms, the plurality of waveforms associated with a reception time;
   ii) determining whether a packet is detected during the reception time;
   iii) determining whether an automatic gain control setting changes during the reception time;
   iv) estimating a covariance matrix based on the plurality of waveforms; and
   v) determining a spatial filter based on the estimated covariance matrix after it is determined that a packet is not detected during the reception time and after it is determined that an automatic gain control setting has not changed during the reception time, wherein said determining a spatial filter based on the estimated covariance matrix is performed after operations ii) and iii),
   wherein when it is so determined that a packet is detected during the reception time or an automatic gain control setting changes during the reception time, at least operations i)-iii) are repeated.

2. The method of claim 1, wherein when it is so determined that a packet is detected during the reception time or an automatic gain control setting changes during the reception time, at least operations i)-iv) are repeated.

3. The method of claim 1, wherein operation iv) is performed prior to at least one of operation ii) or operation iii).

4. The method of claim 1, wherein determining whether a packet is detected during the reception time comprises determining whether a control signal is received between a time when the plurality of waveforms is obtained and a later time after the covariance matrix is estimated.

5. The method of claim 4, further comprising determining an interval based on latency between reception of a first sample of a packet and detection of the packet, wherein the reception time comprises a period of time after the covariance matrix is estimated not less than the interval.

6. The method of claim 1, further comprising:
   v) determining a spatial filter based on an inverse of the estimated covariance matrix; and
   vi) mitigating interference in a second plurality of waveforms by applying the spatial filter to the second plurality of waveforms.

7. The method of claim 6, wherein the spatial filter is the inverse of the estimated covariance matrix.

8. The method of claim 6, wherein the spatial filter is a square root of the inverse of the estimated covariance matrix.

9. A programmable storage device comprising code which, when executed, causes a processor to perform a method of estimating a covariance matrix in a communication system, the method comprising:
   i) obtaining a plurality of waveforms, the plurality of waveforms associated with a reception time;
   ii) determining whether a packet is detected during the reception time;
   iii) determining whether an automatic gain control setting changes during the reception time;
   iv) estimating a covariance matrix based on the plurality of waveforms; and
   v) determining a spatial filter based on the estimated covariance matrix after it is determined that a packet is not detected during the reception time and after it is determined that an automatic am control setting has not changed during the reception time, wherein said determining a spatial filter based on the estimated covariance matrix is performed after operations ii) and iii),
   wherein when it is so determined that a packet is detected during the reception time or an automatic gain control setting changes during the reception time, at least operations i)-iii) are repeated.

10. The programmable storage device of claim 9, further comprising code which, when executed, causes a processor to mitigate interference in a second plurality of waveforms by applying a spatial filter based on an inverse of the covariance matrix.

11. A method of estimating a covariance matrix, the method comprising:
    receiving a first plurality of waveforms, including at least one packet;
    estimating a first covariance matrix based on the first plurality of waveforms;
    determining that a predetermined amount of time has elapsed in which no packets have been detected;

after determining that the predetermined amount of time has elapsed, receiving a second plurality of waveforms; and estimating a second covariance matrix based on the second plurality of waveforms, wherein estimating a second covariance matrix comprises deriving a covariance matrix based on at least one prior estimated covariance matrix.

12. The method of claim 11, further comprising periodically estimating a covariance matrix until another packet is detected, after determining that the predetermined amount of time has elapsed.

13. The method of claim 12, wherein periodically estimating a covariance matrix causes the estimated covariance matrix to converge towards an estimate of interference and noise without a signal of interest.

14. The method of claim 11, further comprising mitigating interference in a third plurality of waveforms by applying a spatial filter based on an inverse of at least one of the first covariance matrix or the second covariance matrix.

15. A method of estimating a covariance matrix in a communication system, the method comprising:
   i) obtaining a plurality of waveforms, the plurality of waveforms associated with a reception time;
   ii) determining whether a packet is detected during the reception time;
   iii) determining whether an automatic gain control setting changes during the reception time;
   iv) estimating a covariance matrix based on the plurality of waveforms, wherein when it is so determined that a packet is detected during the reception time or an automatic gain control setting changes during the reception time, at least operations i)-iii) are repeated;
   v) determining a spatial filter based on an inverse of the estimated covariance matrix; and
   vi) mitigating interference in a second plurality of waveforms by applying the spatial filter to the second plurality of waveforms, said spatial filter is the inverse of the estimated covariance matrix.

16. A method of estimating a covariance matrix in a communication system, the method comprising:
   i) obtaining a plurality of waveforms, the plurality of waveforms associated with a reception time;
   ii) determining whether a packet is detected during the reception time;
   iii) determining whether an automatic gain control setting changes during the reception time;
   iv) estimating a covariance matrix based on the plurality of waveforms, wherein when it is so determined that a packet is detected during the reception time or an automatic gain control setting changes during the reception time, at least operations i)-iii) are repeated;
   v) determining a spatial filter based on an inverse of the estimated covariance matrix; and
   vi) mitigating interference in a second plurality of waveforms by applying the spatial filter to the second plurality of waveforms, said spatial filter is the inverse of the estimated covariance matrix, said spatial filter is a square root of the inverse of the estimated covariance matrix.

17. A method of estimating a covariance matrix, the method comprising:
   receiving a first plurality of waveforms, including at least one packet;
   estimating a first covariance matrix based on the first plurality of waveforms;
   determining that a predetermined amount of time has elapsed in which no packets have been detected;
   after determining that the predetermined amount of time has elapsed, receiving a second plurality of waveforms;
   estimating a second covariance matrix based on the second plurality of waveforms; and
   periodically estimating a covariance matrix until another packet is detected, after determining that the predetermined amount of time has elapsed; wherein periodically estimating a covariance matrix causes the estimated covariance matrix to converge towards an estimate of interference and noise without a signal of interest.

* * * * *

UNITED STATES PATENT AND TRADEMARK OFFICE
CERTIFICATE OF CORRECTION

PATENT NO. : 8,737,501 B2  
APPLICATION NO. : 12/333234  
DATED : May 27, 2014  
INVENTOR(S) : Anish Narendra Shah Page 1 of 1

It is certified that error appears in the above-identified patent and that said Letters Patent is hereby corrected as shown below:

IN THE CLAIMS:

In column 16 at line 47, In Claim 9, change "am" to --gain--.

Signed and Sealed this  
Twenty-third Day of December, 2014

Michelle K. Lee  
*Deputy Director of the United States Patent and Trademark Office*